(12) United States Patent
Kimura

(10) Patent No.: US 9,758,065 B2
(45) Date of Patent: Sep. 12, 2017

(54) VEHICLE SEAT

(71) Applicant: TOYOTA BOSHOKU KABUSHIKI KAISHA, Aichi-ken (JP)

(72) Inventor: Masahide Kimura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 100 days.

(21) Appl. No.: 14/694,337

(22) Filed: Apr. 23, 2015

(65) Prior Publication Data

US 2015/0306985 A1 Oct. 29, 2015

(30) Foreign Application Priority Data

Apr. 25, 2014 (JP) ................................. 2014-091096

(51) Int. Cl.
*B60N 2/22* (2006.01)
*B60N 2/44* (2006.01)
(Continued)

(52) U.S. Cl.
CPC ................. *B60N 2/22* (2013.01); *B60N 2/12* (2013.01); *B60N 2/2356* (2013.01); *B60N 2/4435* (2013.01); *B60N 2205/50* (2013.01)

(58) Field of Classification Search
CPC ....................................................... B60N 2/22
See application file for complete search history.

(56) References Cited

U.S. PATENT DOCUMENTS

| 5,718,481 A * | 2/1998 | Robinson | B60N 2/2354 |
| | | | 297/367 R |
| 7,775,594 B2 * | 8/2010 | Bruck | B60N 2/0232 |
| | | | 297/362 |

(Continued)

FOREIGN PATENT DOCUMENTS

| CN | 101524975 | 9/2009 |
| CN | 103502045 | 1/2014 |

(Continued)

OTHER PUBLICATIONS

Chinese Office Action for CN App. No. 201510201842.8 mailed on Feb. 4, 2017, along with English-language translation thereof.

(Continued)

*Primary Examiner* — Timothy J Brindley
(74) *Attorney, Agent, or Firm* — Greenblum & Bernstein, P.L.C.

(57) ABSTRACT

A restricting structure that restricts an allowable adjustment range of a backrest angle of a seatback is formed by a surface abutment structure of a bracket provided on the seatback, and an additional stopper provided on a seat cushion. The additional stopper is joined to a lower arm in a state positioned by a positioning hole in the additional stopper being fit onto a positioning pin that is integrated with the lower arm. A plurality of arrangement positions of the additional stopper are able to be selected by providing the positioning pin in a plurality of locations with respect to the lower arm along a path of a specific location along which additional stopper moves with respect to the lower arm, when the backrest angle of the seatback is changed while the additional stopper is surface abutted against, and temporarily fixed to, the bracket.

5 Claims, 18 Drawing Sheets

(51) Int. Cl.
  *B60N 2/12*     (2006.01)
  *B60N 2/235*    (2006.01)

(56) References Cited

U.S. PATENT DOCUMENTS

| | | | | |
|---|---|---|---|---|
| 8,985,691 | B2* | 3/2015 | Tsuruta | B60N 2/2356 |
| | | | | 297/331 |
| 2010/0026073 | A1 | 2/2010 | Bruck et al. | |
| 2011/0049954 | A1* | 3/2011 | Watanabe | B60N 2/20 |
| | | | | 297/344.1 |
| 2012/0248841 | A1* | 10/2012 | Hellrung | B60N 2/22 |
| | | | | 297/354.1 |
| 2013/0341484 | A1* | 12/2013 | Yamada | B60N 2/682 |
| | | | | 248/636 |
| 2013/0341985 | A1 | 12/2013 | Tsuruta et al. | |
| 2014/0284979 | A1* | 9/2014 | Nihonmatsu | B60N 2/225 |
| | | | | 297/325 |
| 2016/0059742 | A1* | 3/2016 | Sasaki | B60N 2/22 |
| | | | | 297/354.12 |

FOREIGN PATENT DOCUMENTS

| | | |
|---|---|---|
| JP | 2002-102000 | 4/2002 |
| JP | 2008-54748 | 3/2008 |
| JP | 2010-52530 | 3/2010 |
| JP | 2011-116303 | 6/2011 |
| JP | 2013-95400 | 5/2013 |
| JP | 2014-507335 | 3/2014 |

OTHER PUBLICATIONS

Japanese Office Action for JP App. No. 2014-091096 dated May 30, 2017, along with English-language translation thereof.

* cited by examiner

F I G . 6
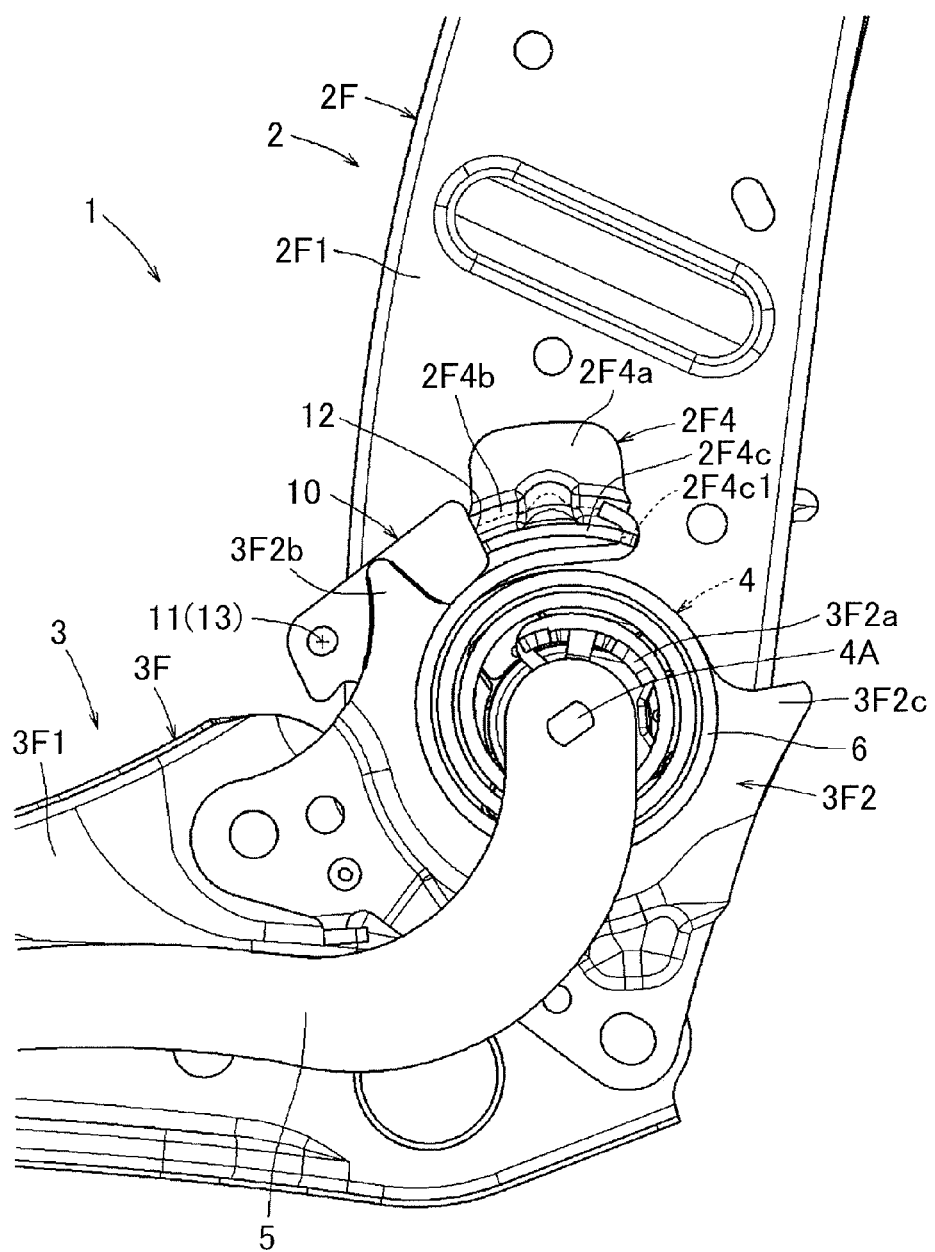

F I G . 17
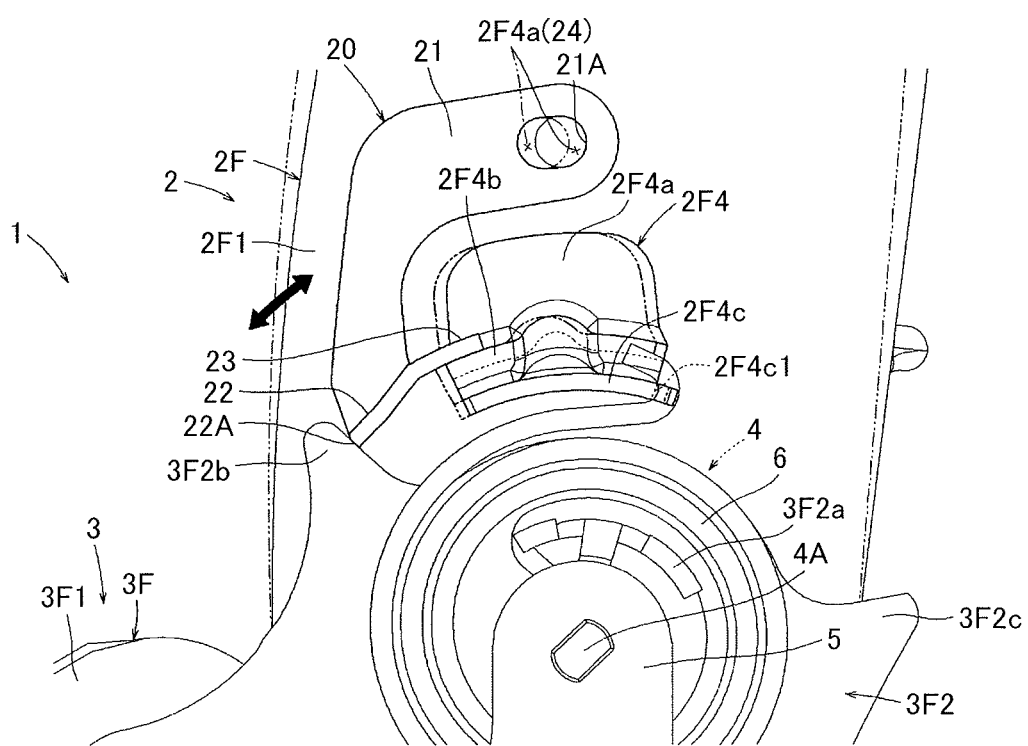

VEHICLE SEAT

INCORPORATION BY REFERENCE

The disclosure of Japanese Patent Application No. 2014-091096 filed on Apr. 25, 2014 including the specification, drawings and abstract is incorporated herein by reference in its entirety.

BACKGROUND OF THE INVENTION

1. Field of the Invention

The invention relates to a vehicle seat. More particularly, the invention relates to a vehicle seat that includes a restricting structure for restricting an allowable adjustment range of a backrest angle of a seatback that is connected to a base on a floor, to within a certain range.

2. Description of Related Art

One known vehicle seat employs a structure that restricts the adjustable range of a seatback to within a certain range (Japanese Patent Application Publication No. 2013-95400 (JP 2013-95400 A). More specifically, the restricting structure is configured to restrict forward and backward movement by a bracket that is joined to a side frame of the seatback abutting against a front stopper or a rear stopper on a lower arm that is joined to a side frame of a seat cushion, as a result of the seatback being tilted (i.e., moved) forward or backward.

SUMMARY OF THE INVENTION

However, in the related art described above, the adjustable range of the backrest angle of the seatback is only able to be set to a single adjustment range that is determined by the mounting position of the bracket, so general applicability is poor. The invention provides a vehicle seat in which the allowable adjustment range of the backrest angle of the seatback is able to be changed without changing the part structure.

A first aspect of the invention relates to a vehicle seat that includes a restricting structure that restricts an allowable adjustment range of a backrest angle of a seatback connected to a base on a floor, to within a certain range. This restricting structure has an engaging portion provided on the seatback, and an engageable portion provided on the base, and is configured to restrict movement of the seatback in a direction in which the backrest angle changes, by the engaging portion and the engageable portion abutting against one another as a result of the seatback moving in the direction in which the backrest angle changes. One of the engaging portion or the engageable portion is arranged in a fixed position on a first member where the one is provided, and the other is configured to be arranged in a selected one of a plurality of arrangement positions with respect to a second member where the other is provided. The other is provided in a selected arrangement position within a region where a given portion of the other moves with respect to the second member, when the backrest angle of the seatback is changed while the other is temporarily fixed to the one while being abutted against the one.

According to this structure, the allowable adjustment range of the backrest angle of the seatback is able to be suitably changed, without changing the part structure, by providing the other, of the engaging portion or the engageable portion in the selected position.

In the mode described above may also take on the structure described below. The other may be joined to the second member, in a state in which a positioning hole formed in the other is positioned by being fit onto a positioning pin provided based on the second member. A selectable structure that enables the plurality of arrangement positions of the other to be selected may be formed by a structure that enables the plurality of arrangement positions of the other to be selected by forming the positioning hole in shape that enables the positioning hole to be selected, in the other, or providing the positioning pin in a plurality of locations with respect to the second member, along a path of the positioning hole or the positioning pin along which the other moves with respect to the second member, when the backrest angle of the seatback is changed while the other is temporarily fixed to the one while being kept surface abutted against the one.

According to this structure, the mounting position of the other of the engaging portion or the engageable portion with respect to the second member is able to be changed by forming the positioning hole in a shape that enables the positioning hole to be selected, in the other, or providing the positioning pin in a plurality of locations with respect to the second member, along a path of the positioning hole or the positioning pin, and changing the position in which the positioning pin is inserted. As a result, the position where the engaging portion and the engageable portion abut against one another, i.e., the allowable adjustment range of the backrest angle of the seatback, is able to be changed without changing the part structure of the other.

In the structure described above, the other may be the engageable portion, and the base that will be the second member may be formed as a thick plate member that is directly joined to a recliner that will be an adjustment mechanism of the backrest angle of the seatback.

According to this structure, the engageable portion is able to be provided in a state having high structural strength by being joined to the thick plate member.

The structure described above may also have the structure described below. In a structure configured to restrict movement of the seatback by the engaging portion abutting against a forward tilt stopper or a backward tilt stopper formed on the thick plate member, as a result of the seatback moving in such a way that the backrest angle changes, when the engageable portion is not arranged on the base, the engageable portion may be provided in a position that restricts movement of the seatback by abutting against the forward tilt stopper or the backward tilt stopper before the engaging portion does.

According to this structure, in a structure in which the allowable adjustment range of the seatback angle of the seatback is a range between where the engaging portion abuts against the forward tilt stopper and the backward tilt stopper of the thick plate member as the standard specifications, the allowable adjustment range of the backrest angle of the seatback is able to be adjusted (i.e., reduced) to an appropriate range using the structure according to the standard specifications, by adding the engageable portion later.

In the structure described above, the positioning pin may be provided in a state integrated with the thick plate member by a jig that supports the thick plate member, and be removed after the engageable portion is welded to the thick plate member.

According to this structure, the engageable portion is able to be appropriately joined to the thick plate member without the positioning pin being left in.

The structure described above may also have the structure described below. The other may be the engaging portion, and be joined to a side frame of the seatback that will be the second member, and the positioning pin may be provided fit into a reference hole when forming the side frame, that is made in the side frame, and be removed after the engaging portion is welded to the side frame.

According to this structure, the positioning pin is able to be set on the side frame of the seatback, using the structure of the reference hole made in the side frame. Also, the engaging portion is able to be appropriately joined to the side frame of the seatback without the positioning pin being left in.

In the structure described above, a thick plate-shaped bracket onto which one end of a spring for urging the seatback in the forward rotating direction is to be hooked may be joined to the side frame, and the engaging portion may be provided extending between the side frame and the bracket and welded to both.

According to this structure, the engaging portion is able to be provided in a state having high structural strength by being joined to the thick plate-shaped bracket.

The structure described above may also have the structure described below. In a structure configured to restrict forward rotational movement of the seatback by the bracket provided on the side frame abutting against the engageable portion provided on the base, as a result of the seatback rotating forward, when the engaging portion is not arranged on the seatback, the engaging portion may be provided in a position that restricts movement of the seatback in the forward rotating direction by abutting against the engageable portion before the bracket does.

According to this structure, in a structure in which the allowable adjustment range of the seatback angle of the seatback is restricted to a position where the bracket provided on the side frame of the seatback abuts against the engageable portion provided on the base as the standard specifications, the allowable adjustment range of the backrest angle of the seatback is able to be adjusted (i.e., reduced) to an appropriate range using the structure according to the standard specifications, by adding the engaging portion later.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a side view showing a forward tilt restricting position of the seatback when an additional stopper is set;

FIG. 17 is a side view of a state in which a backrest angle of the seatback has been changed, with the additional stopper temporarily integrated with an L-shaped bracket.

DETAILED DESCRIPTION OF EMBODIMENTS

Figure 1:
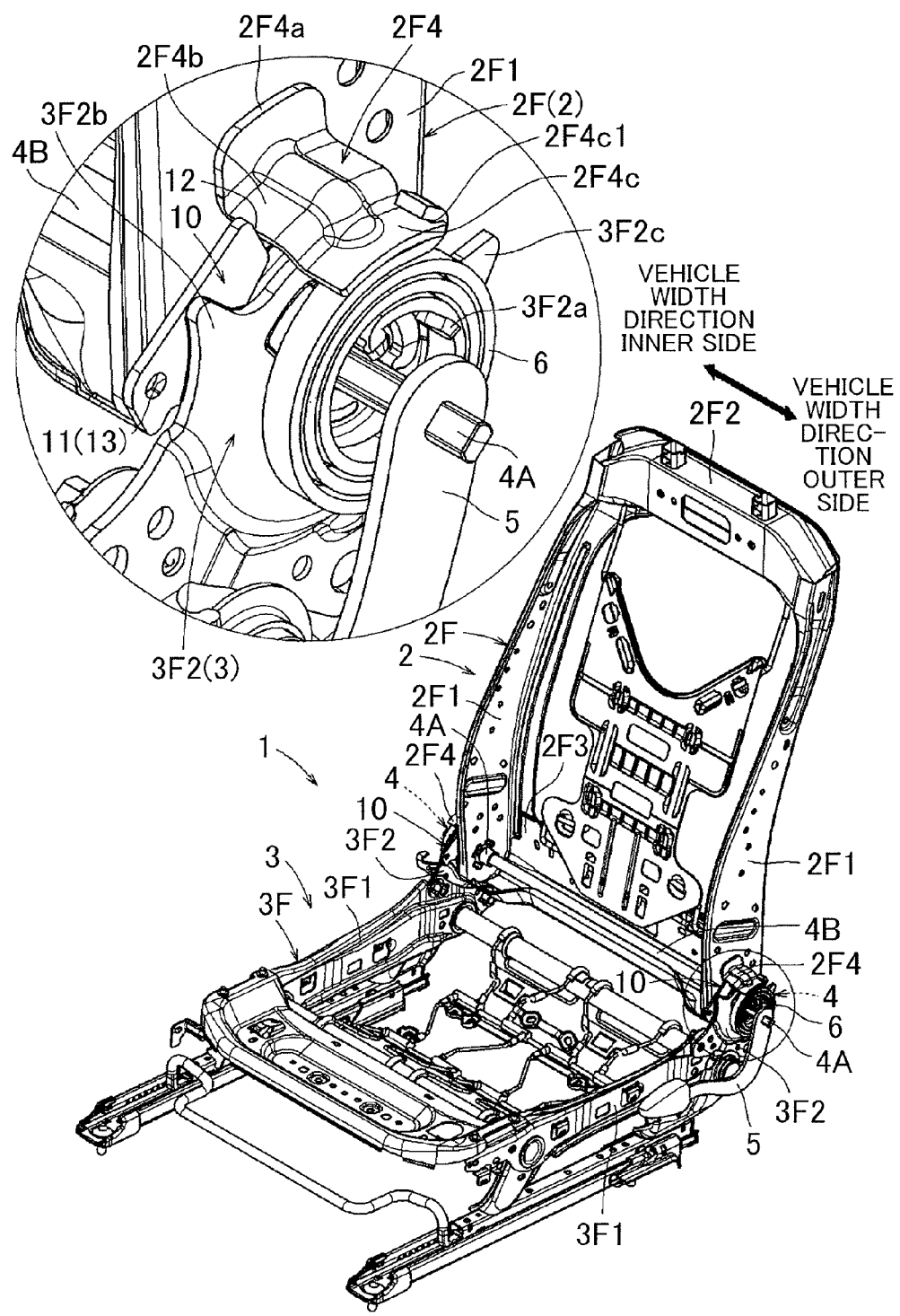
FIG. 1 is a perspective view of the general structure of a vehicle seat according to a first example embodiment of the invention.

Hereinafter, example embodiments of the invention will be described with reference to the accompanying drawings.

First, the structure of a seat 1 according to a first example embodiment of the invention will be described with reference to FIGS. 1 to 9. The seat 1 in this example embodiment is configured as a seat of a vehicle (an automobile), and includes a seatback 2 that will serve as a backrest for a seated occupant, and a seat cushion 3 that will serve as a seating surface for the seated occupant. The seatback 2 is connected to a rear end portion of both the left and right sides of the seat cushion 3 via recliners 4 that function as rotational axis devices (coupling devices) that can stop rotation. As a result, the seatback 2 is able to be held in a state in which the backrest angle is fixed by the recliners 4. Also, the seatback 2 is able to be switched to a state in which the backrest angle is able to be adjusted forward and backward by releasing the fixed state of the backrest angle by the recliners 4, which is accomplished by an operation in which a release lever 5 provided on a side portion, on a vehicle width direction outer side, of the seat cushion 3 is pulled upward. In the description below, portions such as the recliners that are provided in a plurality, with one being provided on each side of the seat, will be referred to in the singular when possible to simplify the description and facilitate understanding.

A back frame 2F that forms the frame of the seatback 2 is a structure that is formed assembled in an overall generally square frame shape when viewed from the front, by a pair of left and right side frames 2F1, an upper frame 2F2 that integrally links together upper end portions of the side frames 2F1, and a lower plate 2F3 that integrally links together lower end portions of the side frames 2F1.

Each side frame 2F1 is formed by a single piece of steel sheet that has been cut in a long shape in the height direction. These side frames 2F1 are arranged with their faces toward each other on the seat inner side. A front edge portion and a rear edge portion of each side frame 2F1 are bent toward the seat inner side, and these edges are rounded so that they tend not to protrude to the outside. This structure gives the side frames 2F1 high structural strength with respect to bending and twisting.

The upper frame 2F2 is formed by a single piece of steel sheet that is bent so as to have an inverted U-shaped transverse cross-section. The upper frame 2F2 extends between upper end portions of both side frames 2F1, and is integrally and strongly joined to these by welding. More specifically, edge portion surfaces in the front-back direction on the right side of the upper frame 2F2 are abutted against and welded to edge portion surfaces in the front-back direction of the side frame 2F1 on the right side, such that the edges of the upper frame 2F2 are covered from the outside by the side frames 2F1 so as not to protrude to the outside. The same also applies to the left end portion of the upper frame 2F2.

The lower plate 2F3 is formed by a single piece of steel sheet that is bent so as to have a generally J-shaped transverse cross-section. The lower plate 2F3 extends between lower end portions of both side frames 2F1, and is integrally and strongly joined to these by welding. More specifically, a right-side edge portion surface of the lower plate 2F3 is abutted from a front side against a rear-side edge portion surface of the side frame 2F1 on the right side and welded thereto, such that the edge of the lower plate 2F3 is covered from the outside by the side frame 2F1 so as not to protrude to the outside. The same also applies to the left end portion of the lower plate 2F3.

The transverse cross-section of the lower plate 2F3 has a J-shape that curves in a shape following a rounded peripheral edge portion shape of the lower end side of each side frame 2F1. The lower plate 2F3 is assembled along the peripheral edge portion of each side frame 2F1. As a result, the lower plate 2F3 protects a rod 4B, described later, that is provided extending between the lower end portions of the side frames 2F1, from the rear side and the lower side. The rod 4B connects operating pins 4A of the recliners 4 together.

The recliner 4 is interposed between a lower end portion of the side frame 2F1 of the seatback 2, and a thick plate-shaped lower arm 3F2, on each side of the seat 1, and connects the two together in a state that enables them to rotate relative to each other around the same axis. Each lower arm 3F2 is joined to a rear end portion of a corresponding side frame 3F1, from among left and right side frames 3F1 that form the frame (i.e., the cushion frame 3F) of the seat cushion 3. The side frame 2F1 of the seatback 2 is provided positioned to the inside of the lower arm 3F2, and the recliner 4 is provided interposed between the side frame 2F1 and the lower arm 3F2.

When operating normally, the recliners 4 are kept in a locked state in which they fix the backrest angle of the seatback 2 by urging. The recliners 4 are switched to an unlocked state in which the backrest angle of the seatback 2 is able to be changed, by an operation in which the release lever 5 provided on a side portion on the vehicle width direction outer side of the seat cushion 3 is pulled up, which releases the locked states of the recliners 4 in unison.

More specifically, the operating pins 4A for unlocking the recliners 4 are assembled inserted one into the center portion of each recliner 4. Also, these operating pins 4A are integrally joined together via the rod 4B, and the release lever 5 attached to an end portion on the outside of the operating pin 4A on the vehicle width direction outer side. As a result, the locked states of the recliners 4 are released (i.e., the recliners 4 unlock) in unison as a result of the operating pins 4A being axially rotated in unison in response to the release lever 5 being pulled up. Also, the recliners 4 are returned to locked states in which the backrest angle of the seatback 2 becomes fixed again by urging, when the release lever 5 is released (i.e., is no longer being pulled up).

Figure 2:
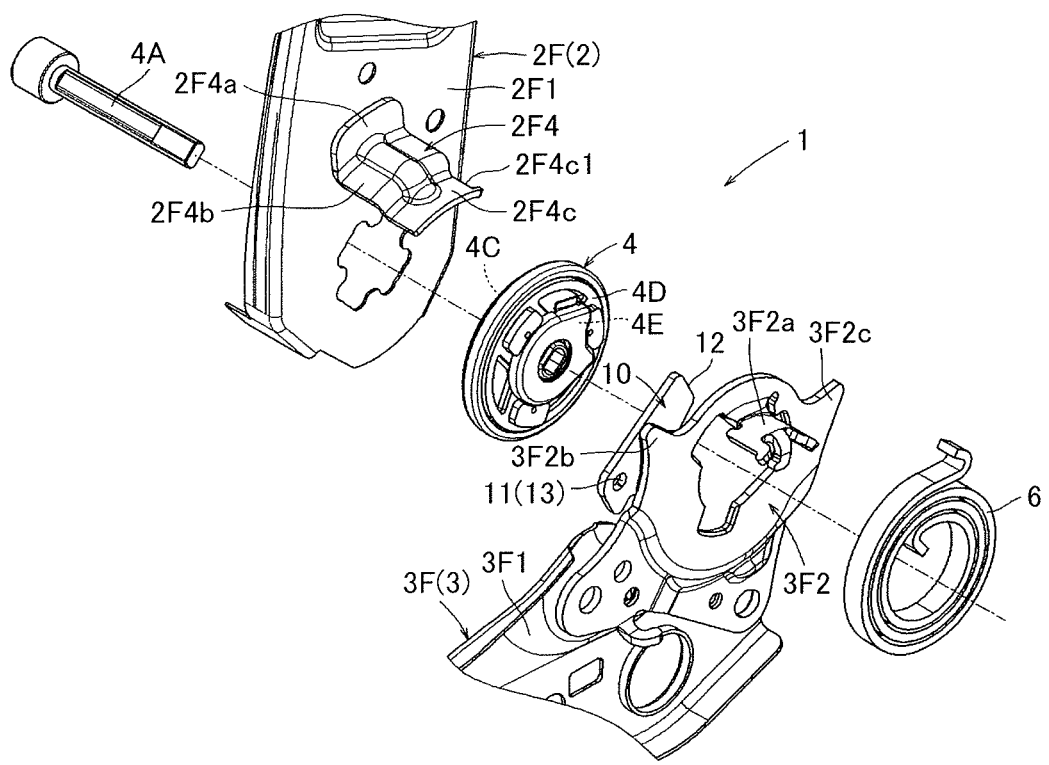
FIG. 2 is an exploded perspective view of the main portions viewed from a seat outer side.
Figure 3:
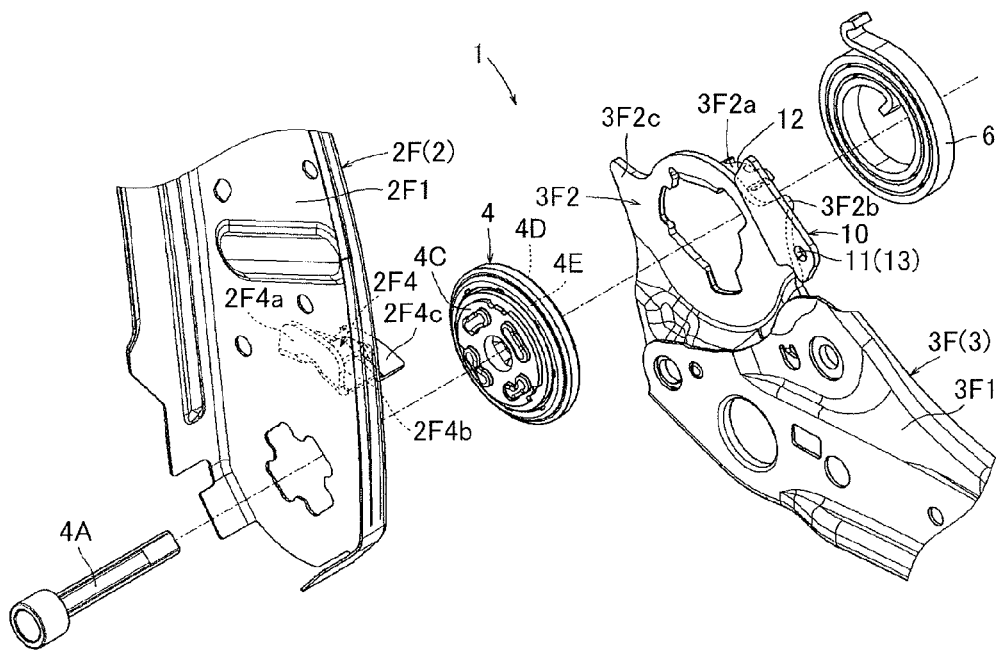
FIG. 3 is an exploded perspective view of the main portions viewed from a seat inner side.
Figure 4:
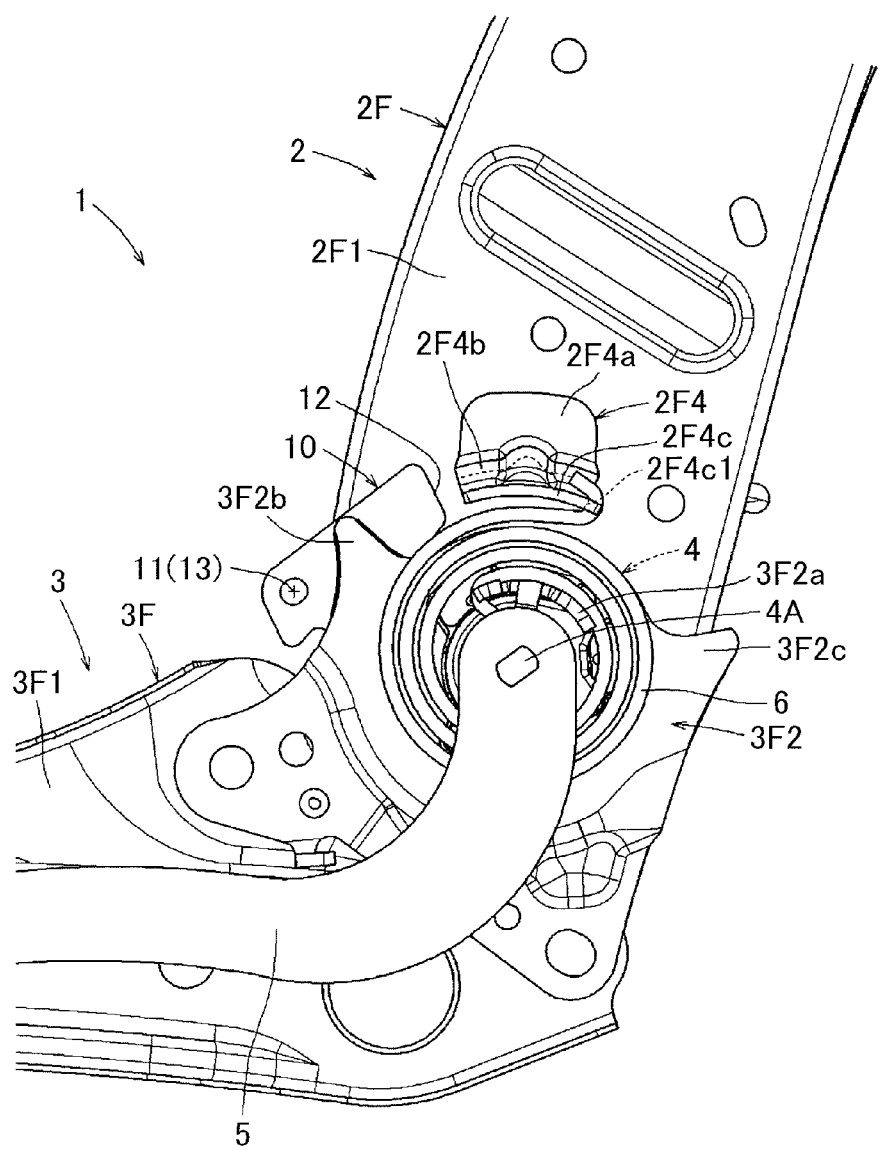
FIG. 4 is a side view of a seatback.

Each recliner 4 is formed by a disc-shaped ratchet 4C and a guide 4D assembled together so as to be able to rotate with respect to each other, as shown in FIGS. 2 and 3. The ratchet 4C is fitted together with an outside surface of the side frame 2F1 of the seatback 2 and is integrally and strongly joined thereto by welding, and the guide 4D is fitted together with an inside surface of the lower arm 3F2 and is integrally and strongly joined thereto by welding.

Relative rotation between the ratchet 4C and the guide 4D is able to be switched to a locked state by the locking of a lock mechanism 4E that is assembled between the ratchet 4C and the guide 4D. Also, the ratchet 4C and the guide 4D are able to be switched to a state in which they are able to rotate relative to one another by the unlocking of the lock mechanism 4E (i.e., by the locked state of the lock mechanism 4E being released). In this way, the recliner 4 places the seatback 2 in a state in which it is able to rotate forward and backward with respect to the lower arm 3F2 on each side (i.e., the seat cushion 3). The lower arm 3F2 is formed by steel sheet that is thicker than the side frame 2F1 of the seatback 2, and has a structural strength that is high enough to be able to firmly receive a load of a bending moment around the recliner 4 that is received when a backrest load is applied to the seatback 2.

The lock mechanism 4E is configured to stop relative rotation between the ratchet 4C and the guide 4D by a surface with external teeth of a lock member (a pawl), not shown, that is assembled to the guide 4D, meshing from the inside in the radial direction with a surface with internal teeth formed on an inner peripheral surface of a cylindrical portion, not shown, that protrudes from an outer peripheral portion of the ratchet 4C. The surface with external teeth of the lock member (the pawl), not shown, described above meshes in a different meshing position with respect to the surface with internal teeth of the ratchet 4C, as the backrest angle of the seatback 2 changes, and the meshing pitch is approximately 2 degrees. As a result, the seatback 2 is able to fix the backrest angle at two degree pitches with the recliner 4. The basic structure of the recliner 4 is the same as the structure described in patent literature such as Japanese Patent Application Publication No. 2011-116303 (JP 2011-116303 A), so a detailed description thereof will be omitted.

A return spring 6 that constantly applies urging force in a direction that tilts the seatback 2 forward is hooked between the side frame 2F1 and the lower arm 3F2 that is connected to this side frame 2F1. This return spring 6 is formed by a spiral spring, and is attached by an end portion on the inner peripheral side of the return spring 6 being hooked onto a spring hook piece 3F2a that is partially cut out and bent up toward the outside from the lower arm 3F2, and an end portion on the outer peripheral side of the return spring 6 being hooked onto a spring hook piece 2F4c of a bracket 2F4 that is joined to the outside surface of the side frame 2F1 of the seatback 2 (see FIGS. 4 and 9).

When the fixed state of the backrest angle that is realized by the recliner 4 is released, the seatback 2 is raised to a position abutting against the back of the seated occupant by rotational urging force exhibited by the return spring 6, and the backrest angle is able to be adjusted freely forward and backward matching the movement of the seated occupant as he or she leans his or her back forward or backward. Providing this kind of urging structure makes it possible to easily adjust the backrest angle of the seatback 2.

Rotational movement of the seatback 2 in the forward tilting direction is restricted at a position where the bracket 2F4 that is joined to the side frame 2F1 abuts against an abutting surface 12 of an additional stopper 10 that is joined to a front portion of the lower arm 3F2. Also, rotational movement of the seatback 2 in the backward tilting direction is restricted at a position where the bracket 2F4 that is joined to the side frame 2F1 abuts against a backward tilt stopper 3F2c formed protruding in a horn shape from a rear upper portion of the lower arm 3F2. Here, the bracket 2F4 is an example of an "engaging portion" of the invention, and the additional stopper 10 is an example of an "engageable portion" of the invention. Also, the lower arm 3F2 is an example of a "base" and a "thick plate member" of the invention.

In this way, the backrest angle of the seatback 2 is able to be adjusted forward and backward with respect to the lower arm 3F2 (i.e., the seat cushion 3), between a position where the bracket 2F4 abuts against the abutting surface 12 of the additional stopper 10 (i.e., a forward tilt position) and a position where the bracket 2F4 abuts against the backward tilt stopper 3F2c formed on the lower arm 3F2 (i.e., a backward tilt position). The additional stopper 10 is configured as a retrofitted mounting part that is additionally mounted afterward separately when it is desired that the allowable adjustment range of the backrest angle of the seatback 2 described above be narrower than when the additional stopper 10 is not set.

Figure 5:
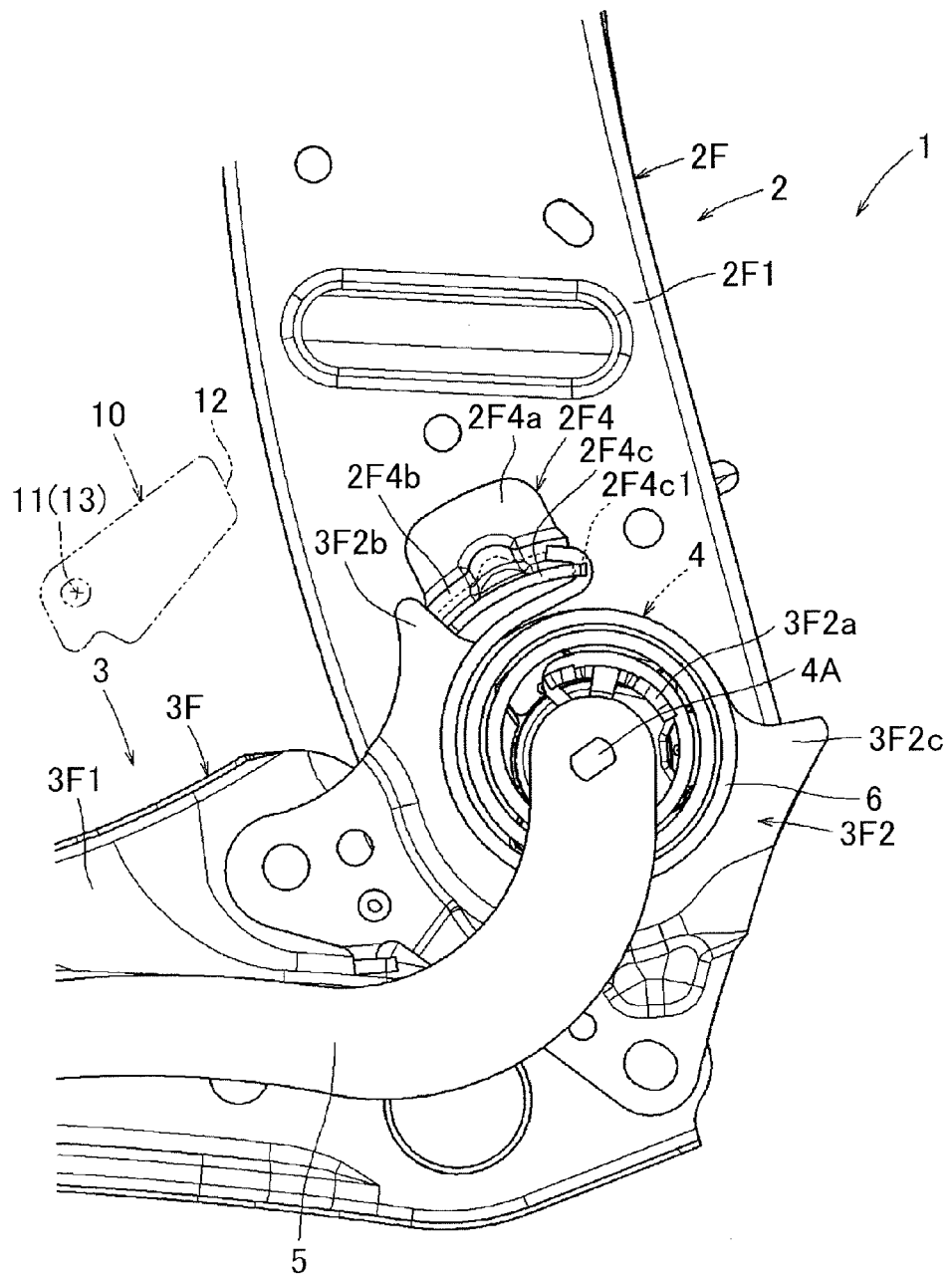
FIG. 5 is a side view showing a forward tilt restricting position of the seatback before an additional stopper is set.

That is, when the additional stopper 10 is not set, the rotational movement of the seatback 2 in the forward tilting direction is restricted at a position where the bracket 2F4 abuts against forward tilt stopper 3F2b formed protruding in a horn shape from a front upper portion of the lower arm 3F2, as shown in FIG. 5. The additional stopper 10 described above is additionally provided afterward (i.e., is retrofitted) to the seat 1 formed in this way when it is desired that the allowable adjustment range of the backrest angle of the seatback 2 be stopped by a position before the position where the bracket 2F4 abuts against the forward tilt stopper 3F2b.

Here, the bracket 2F4 is formed by steel sheet that is thicker than the side frame 2F1 of the seatback 2, and is bent in a general L-shape. More specifically, the bracket 2F4 is formed in a general L-shape having a fixed piece 2F4a surface abutted against the outside surface of the side frame 2F1 of the seatback 2 and welded thereto, an engaging piece 2F4b that extends bent toward the seat outer side from a lower edge portion of the fixed piece 2F4a, and a spring hook piece 2F4c that extends bent even further toward the seat outer side after being bent downward from an extended tip of the engaging piece 2F4b.

The front surface and rear surface of the engaging piece 2F4b of the bracket 2F4 are portions that surface abut with, and are thus engaged with, the abutting surface 12 of the additional stopper 10 and the backward tilt stopper 3F2c of the lower arm 3F2, respectively. Also, the spring hook piece 2F4c of the bracket 2F4 is a portion that an end portion on the outer peripheral side of the return spring 6 is hooked onto (i.e., attached to). A recessed portion 2F4c1 for hooking the end portion on the outer peripheral side of the return spring 6 onto is formed on a rear edge portion of the spring hook piece 2F4c.

By additionally providing (i.e., retrofitting) the additional stopper 10 afterward in this way, the allowable adjustment range of the backrest angle of the seatback 2 is able to easily adjusted so as to be narrower, even in a seat 1 manufactured according to specifications in which the additional stopper 10 is not set. Therefore, when the seat 1 is mounted in a vehicle for disabled persons, for example, if the backrest angle of the seatback 2 is too steep (i.e., the seatback 2 is too upright), a headrest mounted to an upper portion of the seatback 2 or the head of a seated occupant may tend to catch on a ceiling surface of the vehicle when the seat 1 is moved while being rotated out of the vehicle. However, this problem is able to be avoided by providing the additional stopper 10 to restrict the backrest angle of the seatback 2 so that the backrest angle of the seatback 2 is unable to be raised beyond a predetermined angle.

Therefore, when manufacturing the seat 1 that will be mounted in a vehicle for disabled persons such as that described above, the seat 1 suited to this type of vehicle for disabled persons is able to be easily manufactured by simply additionally later providing (i.e., retrofitting) the additional stopper 10 to the seat 1 manufactured according to the normal specifications that was not designed to be mounted in such a vehicle (i.e., to the seat 1 in which rotational movement of the seatback 2 in the forward tilting direction is restricted by the bracket 2F4 abutting against the forward tilt stopper 3F2b of the lower arm 3F2).

Also, the additional stopper 10 can be mounted to the lower arm 3F2 in a selected one of two mounting positions. More specifically, the additional stopper 10 is in a state abutted against the inside surface of the forward tilt stopper 3F2b of the lower arm 3F2, and integrally and strongly joined thereto by welding. At this time, the positioning of the location where the additional stopper 10 abuts against the inside surface of the lower arm 3F2 is determined in the manner described below.

Figure 9:
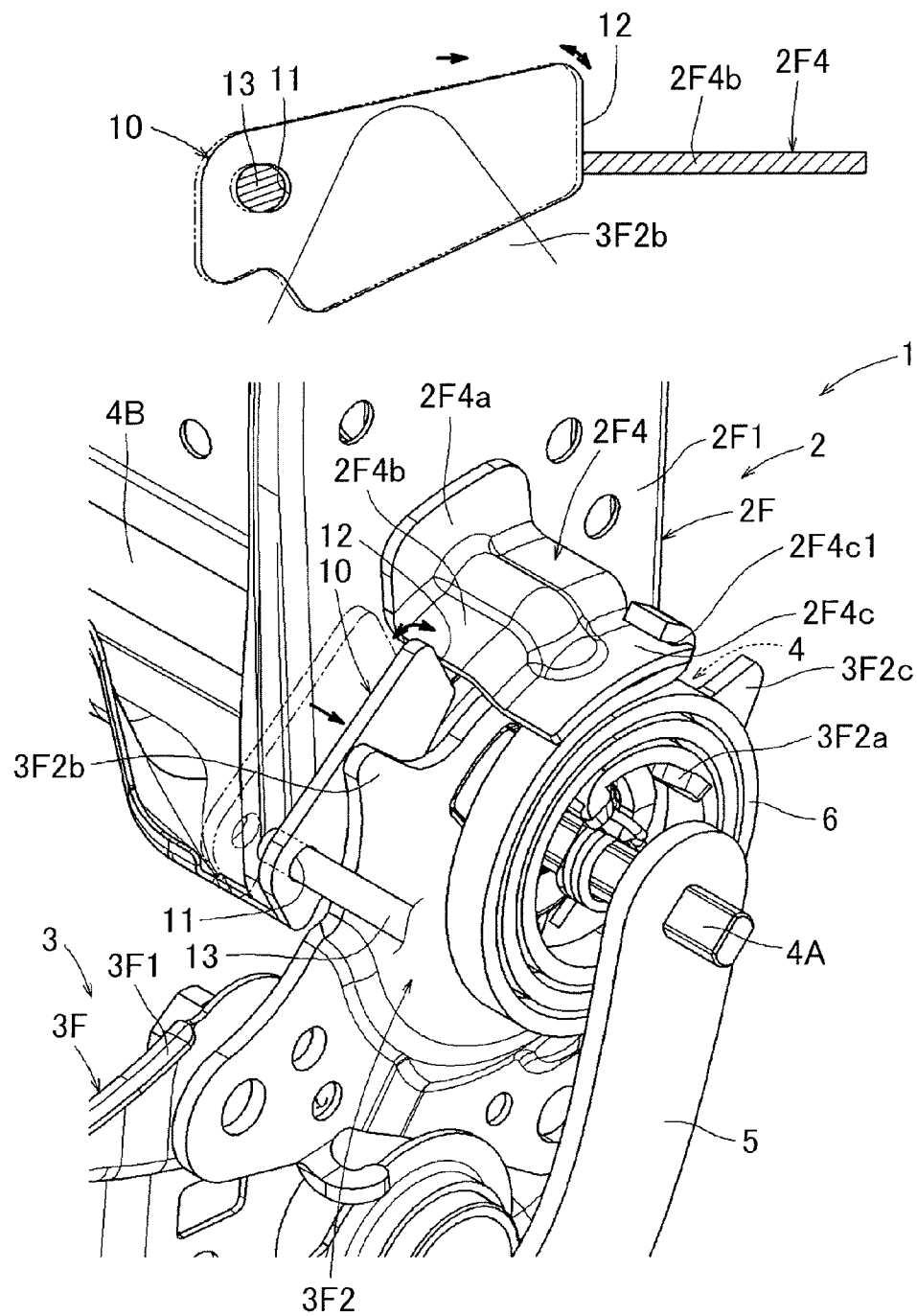
FIG. 9 is a partial enlarged perspective view of the manner in which the additional stopper is joined to a lower plate.
Figure 10:
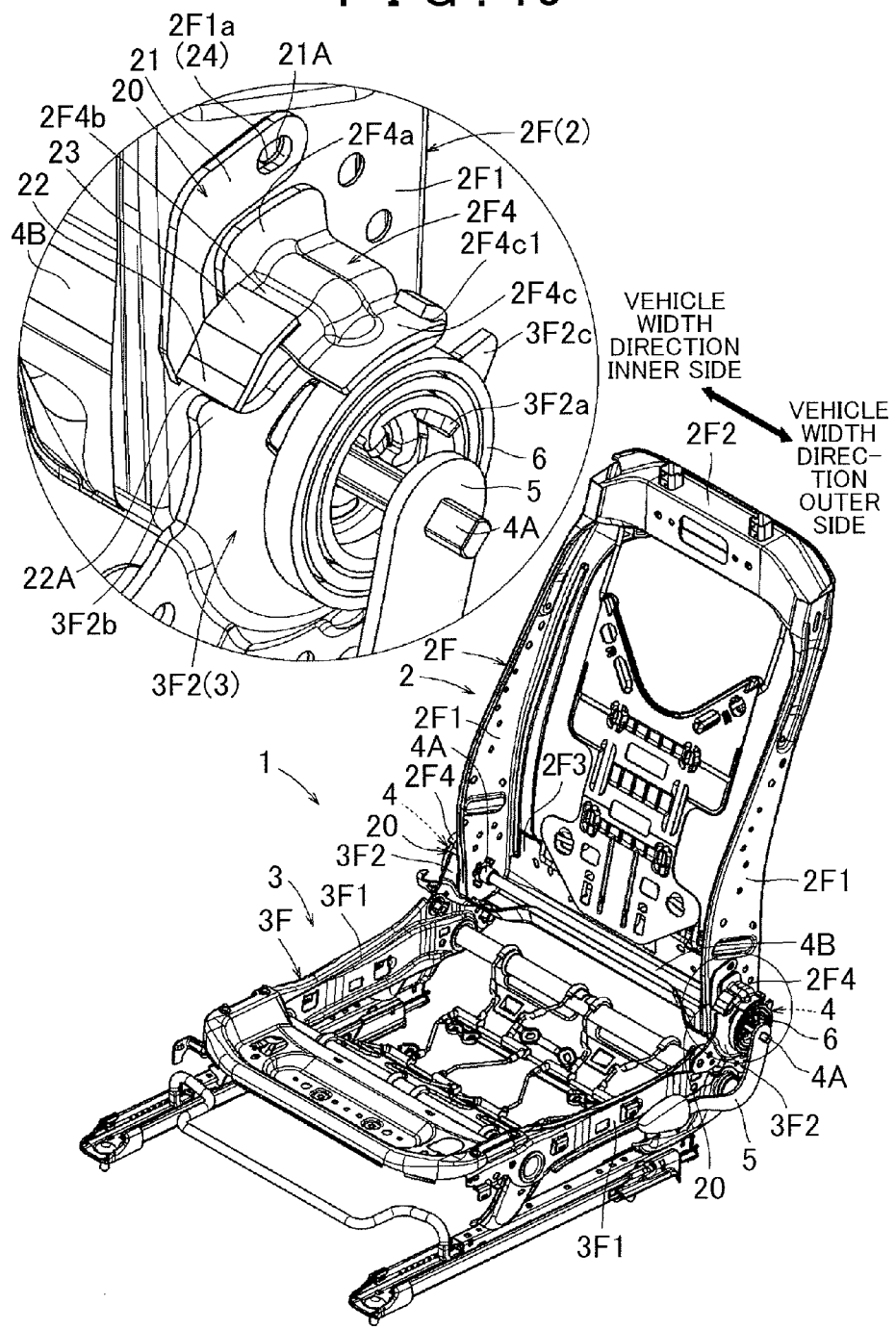
FIG. 10 is a perspective view of the general structure of a vehicle seat according to a second example embodiment of the invention.
Figure 11:
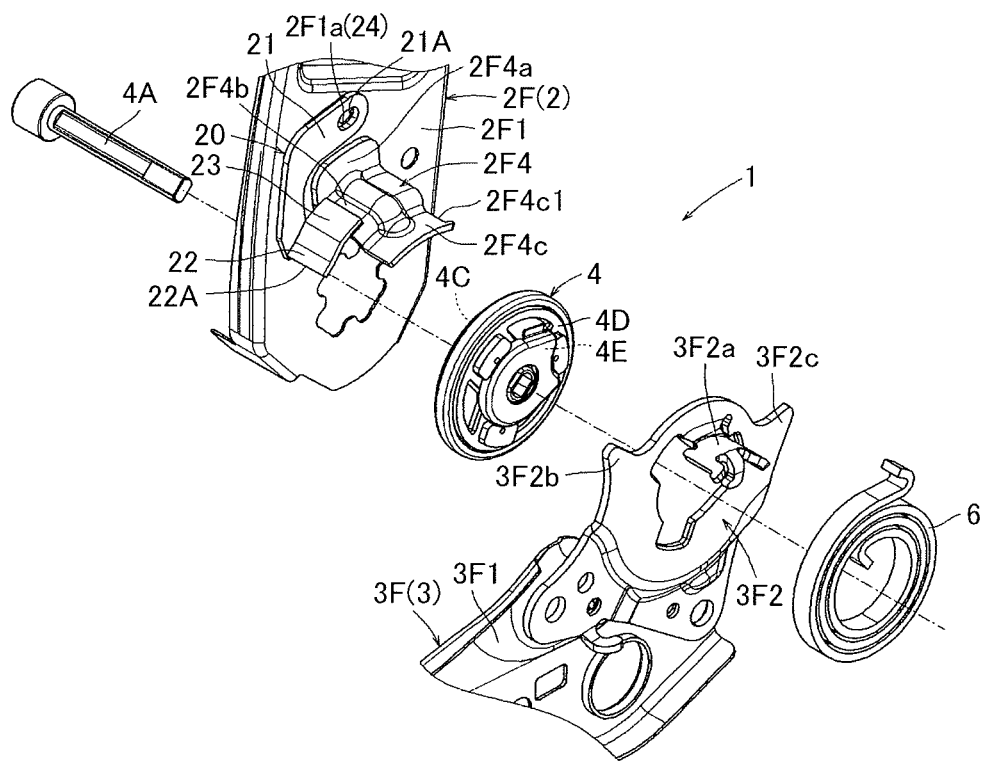
FIG. 11 is an exploded perspective view of the main portions viewed from the seat outer side.
Figure 12:
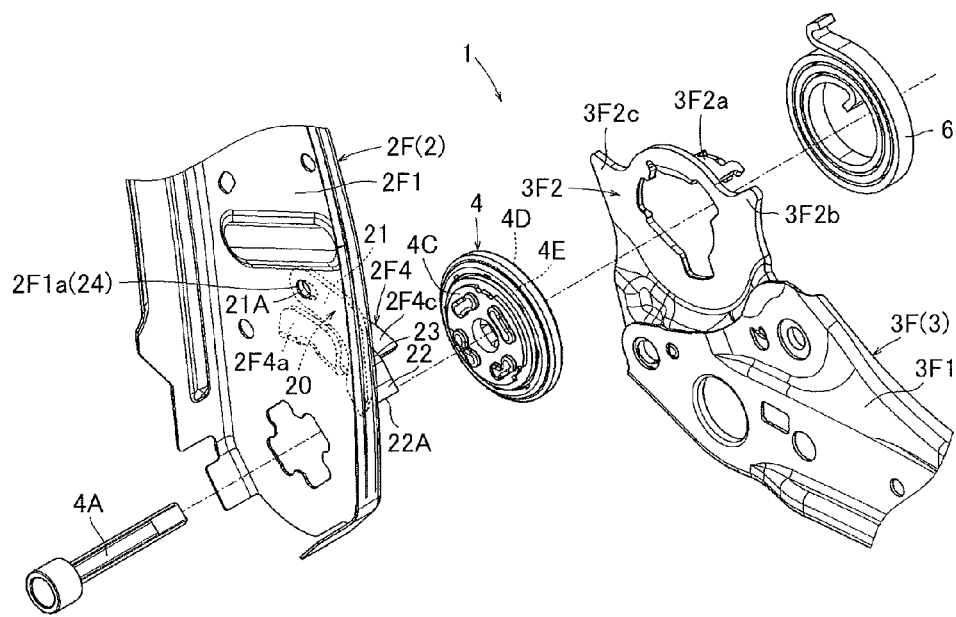
FIG. 12 is an exploded perspective view of the main portions viewed from the seat inner side.
Figure 13:
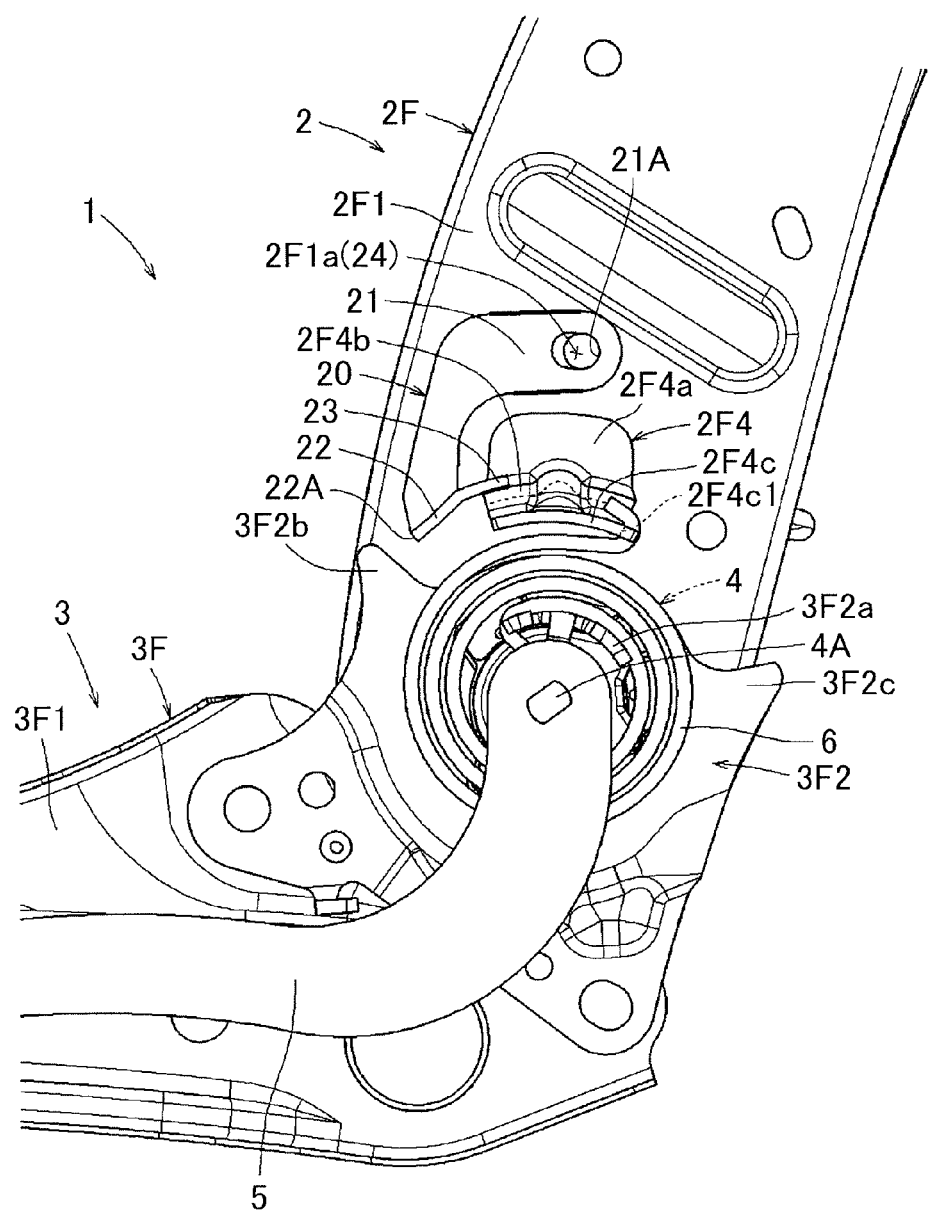
FIG. 13 is a side view of a seatback.

That is, as shown in FIG. 9, the backrest angle of the seatback 2 is fixed at a desired restricted angle (i.e., position) by the recliner 4 in advance. Also, in this state, the lower arm 3F2 is supported by being set in a jig, not shown. Next, the additional stopper 10 is inserted onto a cylindrical positioning pin 13 standing erect on the jig, not shown, that supports the lower arm 3F2 described above, and the abutting surface 12 of the additional stopper 10 is surface abutted against the front surface of the engaging piece 2F4b of the bracket 2F4 that is joined to the side frame 2F1 of the seatback 2. More specifically, the cylindrical positioning pin 13 is inserted into a positioning hole 11 formed through the additional stopper 10, and the abutting surface 12 of the additional stopper 10 is surface abutted against the front surface of the engaging piece 2F4b of the bracket 2F4 by an adjustment that involves swinging the additional stopper 10 around the positioning pin 13.

By making the positioning hole 11 in the additional stopper 10 an oblong shape that is slightly longer than the sectional diameter of the positioning pin 13, manufacturing error of these is able to be absorbed, and the abutting surface 12 is able to be set in a state surface abutting against the front surface of the engaging piece 2F4b of the bracket 2F4 at this time. Also, by abutting the additional stopper 10 against the inside surface of the lower arm 3F2 and welding it thereto in this positioned state, the additional stopper 10 is provided in a state able to restrict the backrest angle of the seatback 2 to the desired angle (i.e., restrict the seatback 2 to a desired position) by abutting against the engaging piece 2F4b of the bracket 2F4. Then the lower arm 3F2 is removed from the jig, not shown, and the positioning pin 13 is pulled out from the positioning hole 11 in the additional stopper 10, such that the additional stopper 10 is in a state integrally joined to the lower arm 3F2 without the positioning pin 13 being left in.

Figure 8:
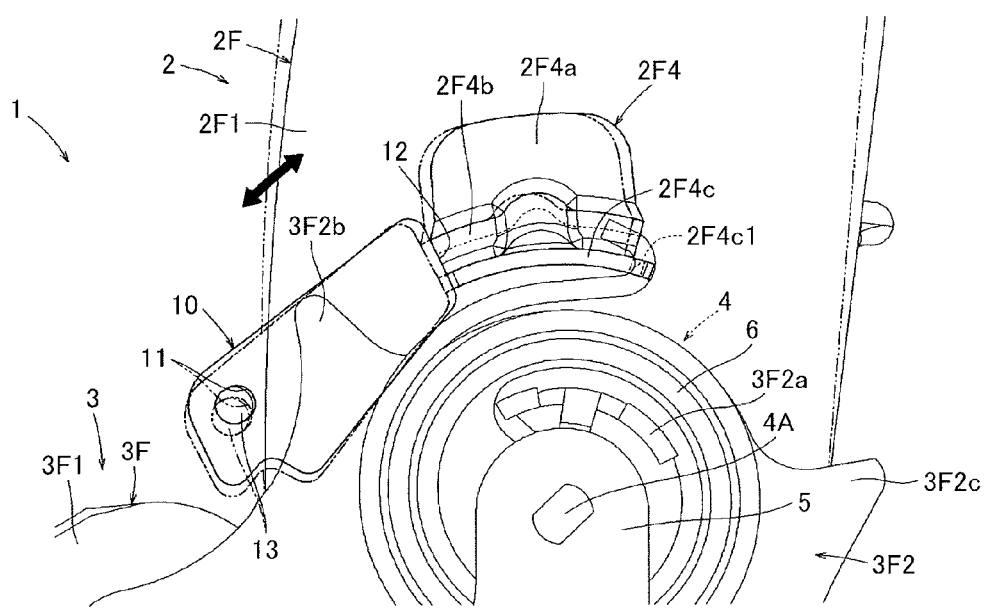
FIG. 8 is a side view of a state in which a backrest angle of the seatback has been changed, with the additional stopper temporarily integrated with an L-shaped bracket.

The positioning pin 13 is able to be removably attached to the jig, not shown, described above, in two locations described below. That is, as shown in FIG. 8, when the backrest angle of the seatback 2 is changed to two desired angles (i.e., positions) while the abutting surface 12 of the additional stopper 10 is surface abutted against the front surface of the engaging piece 2F4b of the bracket 2F4 and these are temporarily fixed to the side frame 2F1 side of the seatback 2, the positioning pin 13 is provided so as to be removably attached to the jig in two positions (i.e., locations) where the positioning hole 11 is positioned.

Figure 7:
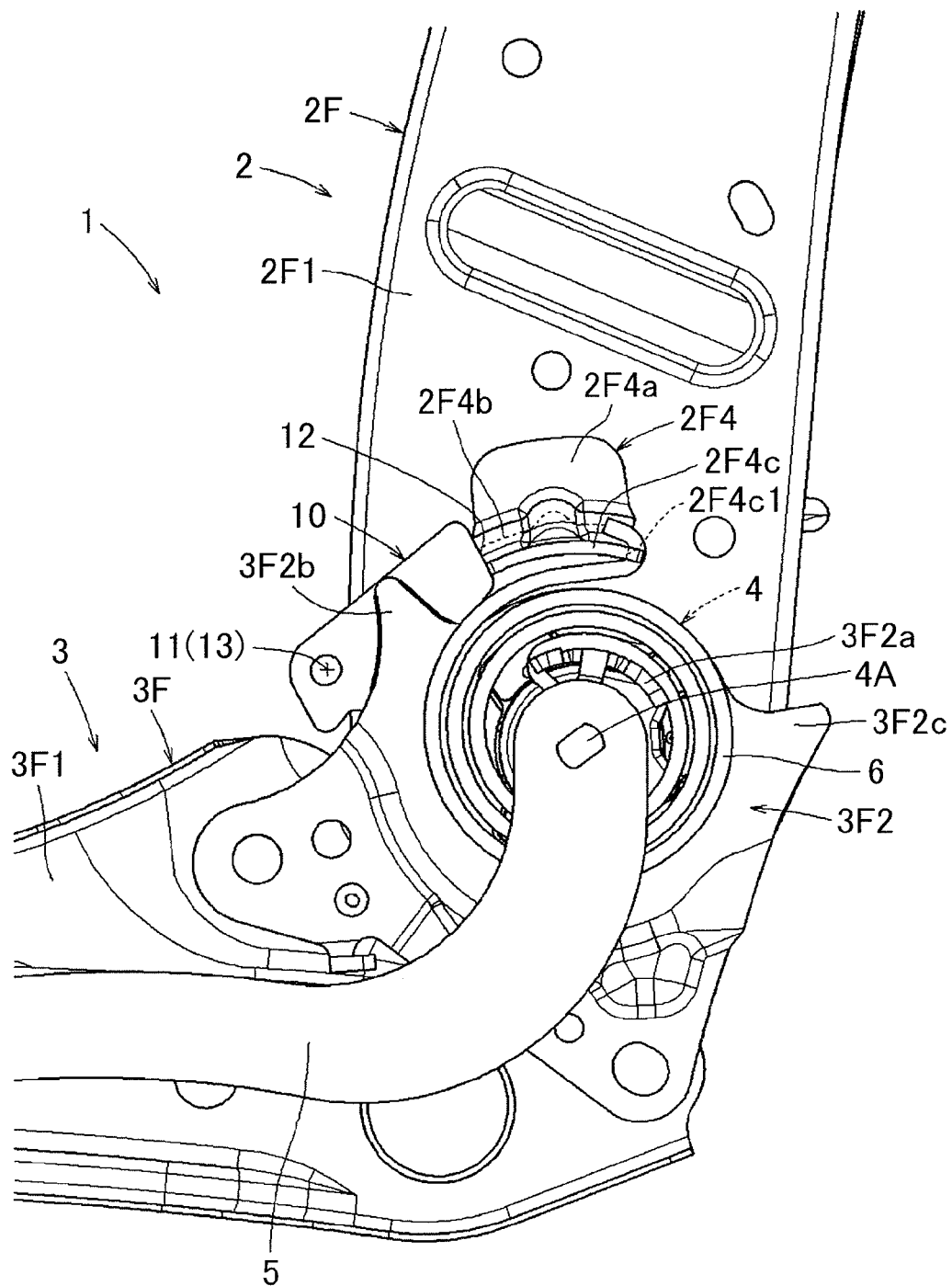
FIG. 7 is a side view showing a forward tilt restricting position of the seatback when the position in which the additional stopper is set is changed.

By setting the mounting position of the positioning pin 13 in this way, the additional stopper 10 is able to be selectively mounted in one of two positions to the lower arm 3F2. As a result, as shown in FIGS. 6 and 7, the highest raised position of the backrest angle of the seatback 2 is able to be easily changed by an adjustment that involves changing the position in which the additional stopper 10 is set.

In summary, the seat 1 of the first example embodiment has the structure described below. That is, the seat 1 includes a restricting structure that restricts the allowable adjustment range of the backrest angle of the seatback 2 that is connected to the base (the lower arm 3F2) on the floor, to within a certain range. This restricting structure has an engaging portion (the bracket 2F4) provided on the seatback 2, and an engageable portion (the additional stopper 10) provided on the base (the lower arm 3F2). The restricting structure is configured to restrict movement of the seatback 2 in a direction in which the backrest angle changes, by the engaging portion (the bracket 2F4) abutting against the engageable portion (the additional stopper 10) as a result of the seatback 2 moving in that direction (i.e., the direction in which the backrest angle changes).

The engaging portion (the bracket 2F4) is arranged in a fixed position with respect to the side frame 2F1 of the seatback 2 (which is a member where the engaging portion (the bracket 2F4) is provided), while the engageable portion (the additional stopper 10) is able to be arranged in a selected one of a plurality (two) positions with respect to the lower arm 3F2 (which is a member where the engageable portion (the additional stopper 10) is provided). The engageable portion (the additional stopper 10) is joined to the lower arm 3F2 in a state in which the positioning hole 11 formed in the engageable portion (the additional stopper 10) is positioned onto the positioning pin 13 that is temporarily integrated by a jig with the lower arm 3F2.

The selectable structure that enables a plurality of arrangement positions of the engageable portion (the additional stopper 10) to be selected is formed by a structure that enables a plurality of arrangement positions of the engageable portion (the additional stopper 10) to be selected by providing the positioning pin 13 in a plurality of locations on a member (i.e., a jig that supports the lower arm 3F2) where the engageable portion (the additional stopper 10) is provided, along a path of a specific location (the positioning hole 11) along which the engageable portion (additional stopper 10) moves with respect to the member (the lower arm 3F2) where the engageable portion (the additional stopper 10) is provided, when the backrest angle of the seatback 2 is changed while the engageable portion (the additional stopper 10) is surfaced abutted against the engaging portion (the bracket 2F4) and temporarily fixed thereto.

In this way, the mounting position of the engageable portion (the additional stopper 10) on the lower arm 3F2 is able to be changed by providing the positioning pin 13 in a plurality of locations with respect to the lower arm 3F2 along a path of the specific location (the positioning hole 11), and changing the position where the positioning pin 13 is inserted. As a result, the position where the engaging portion (the bracket 2F4) and the engageable portion (the additional stopper 10) abut against each other, i.e., the allowable adjustment range of the backrest angle of the seatback 2, is able to be changed without changing the part structure of the engageable portion (the additional stopper 10).

Also, the base (the lower arm 3F2) that is the member where the engageable portion (the additional stopper 10) is provided is formed as a thick plate member that has high structural strength and is directly joined to the recliner 4 that is the adjustment mechanism of the backrest angle of the seatback 2. With this kind of structure, the engageable portion (the additional stopper 10) is able to be provided in a state having high structural strength by being joined to the thick plate member (the lower arm 3F2) that has high structural strength.

Also, in a structure configured to restrict movement of the seatback 2 by the engaging portion (the bracket 2F4) abutting against the forward tilt stopper 3F2b or the backward tilt stopper 3F2c formed on the thick plate member (the lower arm 3F2), as a result of the seatback 2 moving in such a way that the backrest angle of the seatback 2 changes, when the engageable portion (the additional stopper 10) is not installed, the engageable portion (the additional stopper 10) is provided later (i.e., retrofitted) as a portion that restricts movement of the seatback 2 in the forward rotating direction by abutting against the forward tilt stopper 3F2b before the engaging portion (the bracket 2F4) does.

With this kind of structure, in a structure in which the allowable adjustment range of the backrest angle of the seatback 2 is a range between where the engaging portion (the bracket 2F4) abuts against the forward tilt stopper 3F2b and the backward tilt stopper 3F2c of the thick plate member (the lower arm 3F2) as the standard specifications, the allowable adjustment range of the backrest angle of the seatback 2 is able to be adjusted (i.e., reduced) to an appropriate range using the structure of the standard specifications, by adding the engageable portion (the additional stopper 10) later.

Also, the positioning pin 13 is provided in a state integrated with the thick plate member (the lower arm 3F2) by a removable jig that supports the thick plate member (the lower arm 3F2) (i.e., is provided based on the thick plate member), and is removed after the engageable portion (the additional stopper 10) is welded to the thick plate member (the lower arm 3F2). This kind of structure enables the engageable portion (the additional stopper 10) to be suitably joined to the thick plate member (the lower arm 3F2) without the positioning pin 13 being left in.

Also, by having the additional stopper 10 be mounted to the inside surface of the lower arm 3F2, the additional stopper 10 is provided overlapping with the recliner 4 in the arrangement space in the seat width direction, so the additional stopper 10 is able to be provided without making the seat 1 protrude in the width direction. Also, the additional stopper 10 abuts against the bracket 2F4 that is joined to the side frame 2F1 of the seatback 2, in a position closer to the side frame 2F1 than when the additional stopper 10 is mounted to the outside surface of the lower arm 3F2, so a bending load applied to the bracket 2F4 is able to be kept low, and the locking strength against forward tilt rotation of the seatback 2 is able to be further increased.

Continuing on, the structure of the seat 1 according to a second example embodiment of the invention will be described with reference to FIGS. 10 to 18. In this example embodiment, an additional stopper 20 for restricting rotational movement in the forward tilting direction of the seatback 2 is mounted to the outside surface of the side frame 2F1 of the seatback 2, as shown in FIGS. 10 to 13. More specifically, the additional stopper 20 is mounted in a location in front of the bracket 2F4 that is joined to the outside surface of the side frame 2F1 of the seatback 2.

Here, the additional stopper 20 described above is formed by steel sheet that is thicker than the side frame 2F1 of the seatback 2, and has been bent in a general L-shape, similar to the bracket 2F4 described above. More specifically, the additional stopper 20 is formed in a general L-shape having a fixed piece 21 that is surface abutted against the outside surface of the side frame 2F1 of the seatback 2 and welded thereto, an engaging piece 22 that extends bent toward the seat outer side from a lower edge portion of the fixed piece 21, and a curved piece 23 that extends in a shape that curves slightly toward the rear from an edge portion on the rear side of the engaging piece 22.

By setting the additional stopper 20, rotational movement of the seatback 2 in the forward tilting direction is restricted at a position where a front surface 22A (an abutting surface) of the engaging piece 22 of the additional stopper 20 abuts against the forward tilt stopper 3F2b formed protruding in a horn shape from a front upper portion of the lower arm 3F2. Also, rotational movement of the seatback 2 in the backward tilting direction is restricted at a position where the engaging piece 2F4b of the bracket 2F4 that is joined to the side frame 2F1 abuts against the backward tilt stopper 3F2c formed protruding in a horn shape from a rear upper portion of the lower arm 3F2. Here, the additional stopper 20 is an example of the "engaging portion" of the invention, and the forward tilt stopper 3F2b is an example of the "engageable portion" of the invention. Also, the lower arm 3F2 is an example of the "base" of the invention.

In this way, the backrest angle of the seatback 2 is able to be adjusted forward and backward with respect to the lower arm 3F2 (i.e., the seat cushion 3), between a position where the bracket 2F4 and the additional stopper 20 that are joined to the side frame 2F1 abut against the backward tilt stopper 3F2c and the forward tilt stopper 3F2b formed on the lower arm 3F2. The additional stopper 20 is configured as a retrofitted mounting part that is additionally mounted afterward separately when it is desired that the allowable adjustment range of the backrest angle of the seatback 2 described above be narrower than when the additional stopper 20 is not set.

Figure 14:
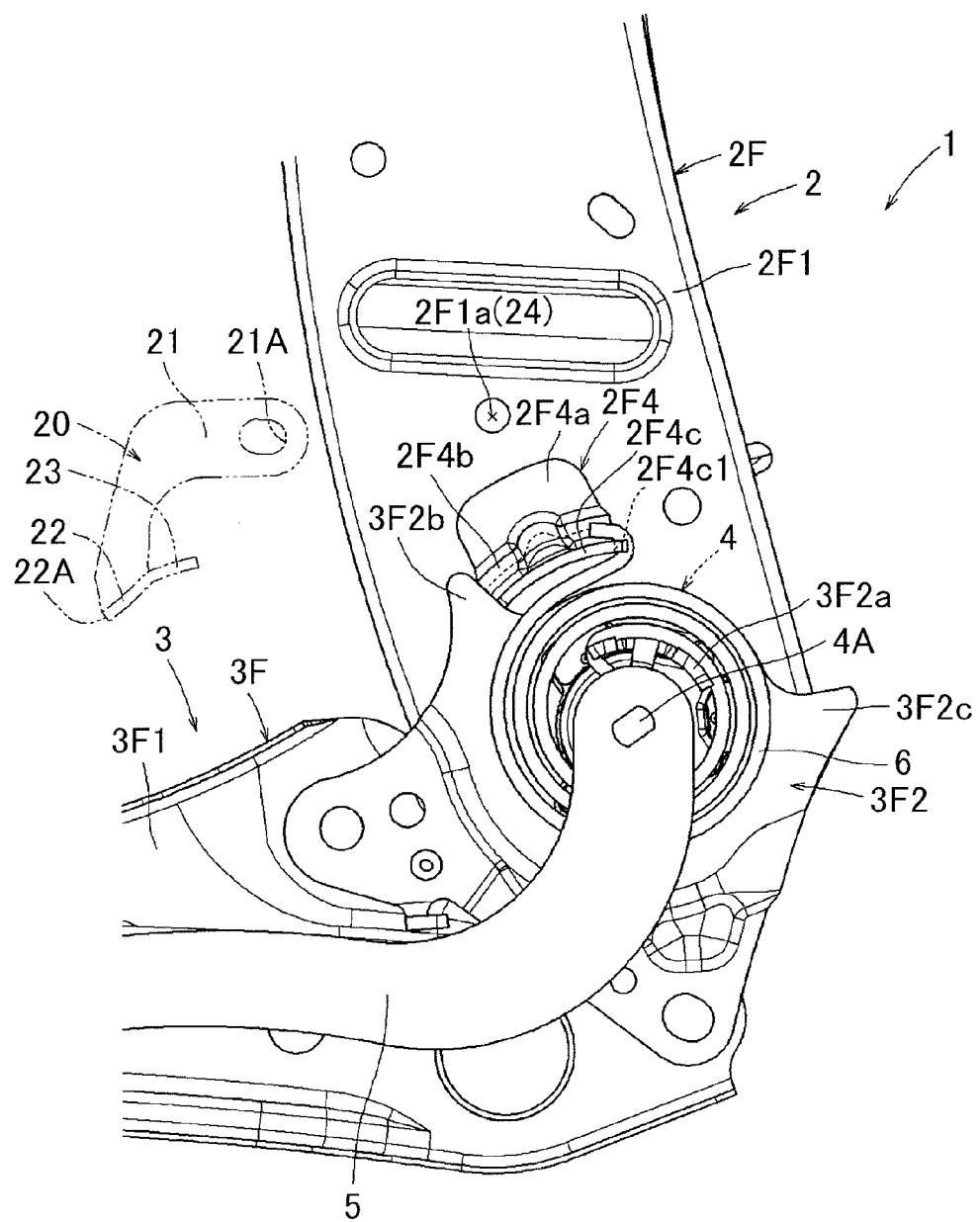
FIG. 14 is a side view of a state before an additional stopper is set.

That is, when the additional stopper 20 is not set, the rotational movement of the seatback 2 in the forward tilting direction is restricted at a position where the bracket 2F4 abuts against forward tilt stopper 3F2b formed protruding in a horn shape from a front upper portion of the lower arm 3F2, as shown in FIG. 14. The additional stopper 20 described above is provided additionally afterward (i.e., is retrofitted) to the seat 1 formed in this way when it is desired that the allowable adjustment range of the backrest angle of the seatback 2 be stopped by a position before the position where the bracket 2F4 abuts against the forward tilt stopper 3F2b.

Here, the bracket 2F4 is formed by steel sheet that is thicker than the side frame 2F1 of the seatback 2, and is bent in a general L-shape. More specifically, the bracket 2F4 is formed in a general L-shape having a fixed piece 2F4a surface abutted against the outside surface of each side frame 2F1 of the seatback 2 and welded thereto, an engaging piece 2F4b that extends bent toward the seat outer side from a lower edge portion of the fixed piece 2F4a, and a spring hook piece 2F4c that extends bent even further toward the seat outer side after being bent downward from an extended tip of the engaging piece 2F4b.

The front surface and rear surface of the engaging piece 2F4b of the bracket 2F4 are portions that surface abut with, and are thus engaged with, the forward tilt stopper 3F2b and the backward tilt stopper 3F2c, respectively, that are formed on the lower arm 3F2. Also, the spring hook piece 2F4c of the bracket 2F4 is a portion that an end portion on the outer peripheral side of the return spring 6 is hooked onto (i.e., attached to). A recessed portion 2F4c1 for hooking an end portion on the outer peripheral side of the return spring 6 on is formed on an edge portion on the rear side of the spring hook piece 2F4c. Here, the return spring 6 is an example of a "spring" of the invention.

By additionally providing (i.e., retrofitting) the additional stopper 20 afterward in this way, the allowable adjustment range of the backrest angle of the seatback 2 is able to easily adjusted so as to be narrower, even in a seat 1 manufactured according to specifications in which the additional stopper 20 is not set. Therefore, when the seat 1 is mounted in a vehicle for disabled persons, for example, if the backrest angle of the seatback 2 is too steep (i.e., the seatback 2 is too upright), the headrest mounted to the upper portion of the seatback 2 or the head of a seated occupant may tend to catch on a ceiling surface of the vehicle when the seat 1 is moved while being rotated out of the vehicle. However, this problem is able to be avoided by providing the additional stopper 20 to restrict the backrest angle of the seatback 2 so that the backrest angle of the seatback 2 is unable to be raised beyond a predetermined angle.

Therefore, when manufacturing the seat 1 that will be mounted in a vehicle for disabled persons such as that described above, the seat 1 suited to this type of vehicle for disabled persons is able to be easily manufactured by simply additionally later providing (i.e., retrofitting) the additional stopper 20 onto the seat 1 manufactured according to the normal specifications that was not designed to be mounted in such a vehicle (i.e., onto the seat 1 in which rotational movement of the seatback 2 in the forward tilting direction is restricted by the bracket 2F4 abutting against the forward tilt stopper 3F2b of the lower arm 3F2).

Also, the additional stopper 20 can be mounted to the lower arm 3F2 of the seatback 2 in a selected one of two mounting positions. More specifically, the additional stopper 20 is in a state abutted against the outside surface, in a region in front of the bracket 2F4, of the side frame 2F1 of the seatback 2, and integrally and strongly joined thereto by welding. At this time, the positioning of the location where the additional stopper 20 abuts against the outside surface of the side frame 2F1 is determined in the manner described below.

Figure 18:
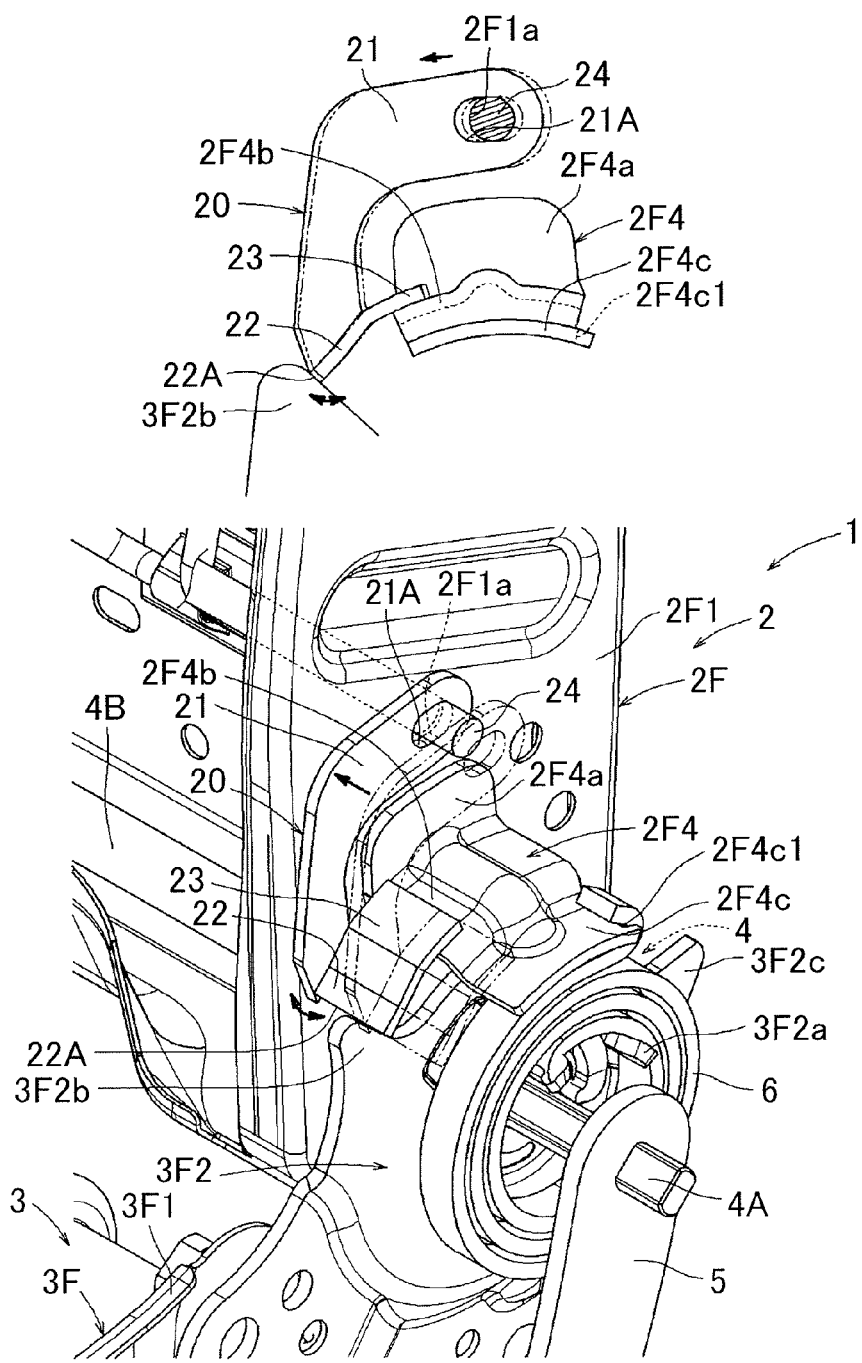
FIG. 18 is a partial enlarged perspective view of the manner in which the additional stopper is joined to a lower plate.

That is, as shown in FIG. 18, the backrest angle of the seatback 2 is fixed at a desired restricted angle (i.e., position) by the recliner 4 in advance. Also, in this state, the lower arm 3F2 is supported by being set in a jig, not shown. Next, the additional stopper 20 is inserted onto a cylindrical positioning pin 24 that is inserted into the side frame 2F1 of the seatback 2, and the front surface 22A (the abutting surface) of the engaging piece 22 of the additional stopper 20 is surface abutted against the forward tilt stopper 3F2b of the lower arm 3F2. More specifically, the cylindrical positioning pin 24 is inserted into a positioning hole 21A formed through the additional stopper 20, and the front surface 22A (the abutting surface) of the additional stopper 20 is surface abutted against the forward tilt stopper 3F2b of the lower arm 3F2 by an adjustment that involves swinging the additional stopper 20 around the positioning pin 24.

By making the positioning hole 21A in the additional stopper 20 an oblong shape that is longer than the sectional diameter of the positioning pin 24, manufacturing error of these is able to be absorbed, and the front surface 22A (the abutting surface) of the engaging piece 22 is able to be set in a state surface abutting against the forward tilt stopper 3F2b of the lower arm 3F2 at this time. Also, by abutting the additional stopper 20 against the outside surface of the side frame 2F1 of the seatback 2 in this set state and welding it thereto in this positioned state, the additional stopper 20 is provided in a state able to restrict the backrest angle of the seatback 2 to the desired angle (i.e., restrict the seatback 2 to the desired position). Then, the back frame 2F is removed from the jig, not shown, and the positioning pin 24 is removed from the side frame 2F1 and pulled out from the positioning hole 21A in the additional stopper 20, such that the additional stopper 20 is in a state integrally joined to the side frame 2F1 without the positioning pin 24 being left in.

Here, the positioning pin 24 is able to be removably attached to a reference hole 2F1a formed in the side frame F1 of the seatback 2. This reference hole 2F1a is formed in advance as a reference point when press-forming the side frame 2F1. That is, the side frame 2F1 is formed in a shape based on the reference hole 2F1a, by being press-formed while the reference hole 2F1a is aligned by being fit onto a protrusion that protrudes from a reference point on a press machine, not shown.

Also, by using the structure of the reference hole 2F1a in the side frame 2F1 as described above, the positioning pin 24 is able to be mounted in a state precisely positioned in the same position on the left and right in the side frame 2F1, by having the positioning pin 24 be provided erect and inserted into this reference hole 2F1a. Also, the additional stopper 20 is able to be mounted on the mounted positioning pin 24 in one of two mounting positions.

More specifically, the positioning hole 21A is formed in the shape described below, in the additional stopper 20. That is, as shown in FIG. 17, when the backrest angle of the seatback 2 is changed to two desired angles (i.e., positions) while the front surface 22A (the abutting surface) of the engaging piece 22 of the additional stopper 20 is surface abutted against the forward tilt stopper 3F2b of the lower arm 3F2 and these are temporarily fixed to the lower arm 3F2 side, the positioning hole 21A is formed in an arc shape around the tilt center of the seatback 2 (i.e., the center point of the recliner 4), as a long hole that passes through the positions at the two locations where the positioning pin 24 is positioned.

Figure 15:
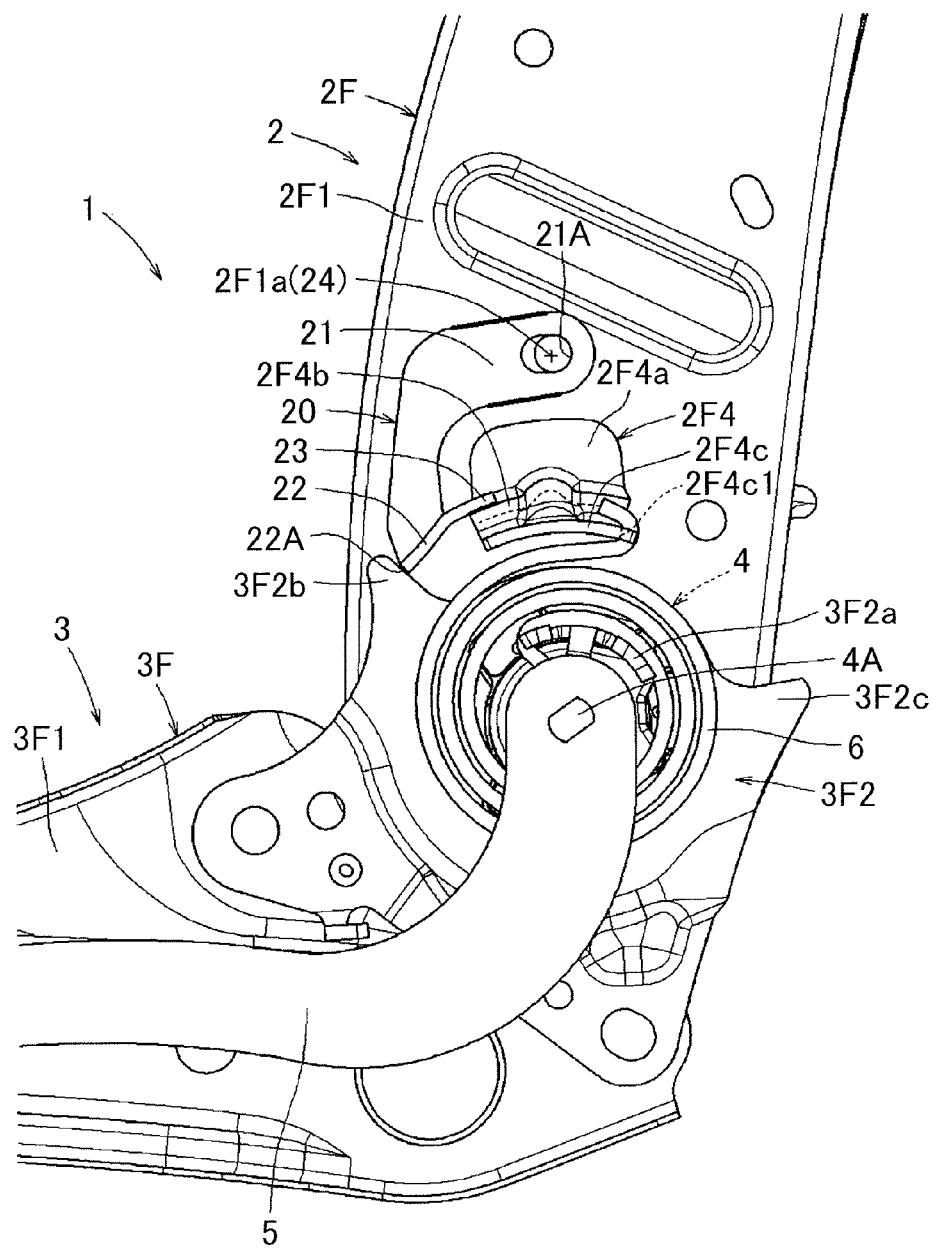
FIG. 15 is a side view of a state in which the additional stopper is set.
Figure 16:
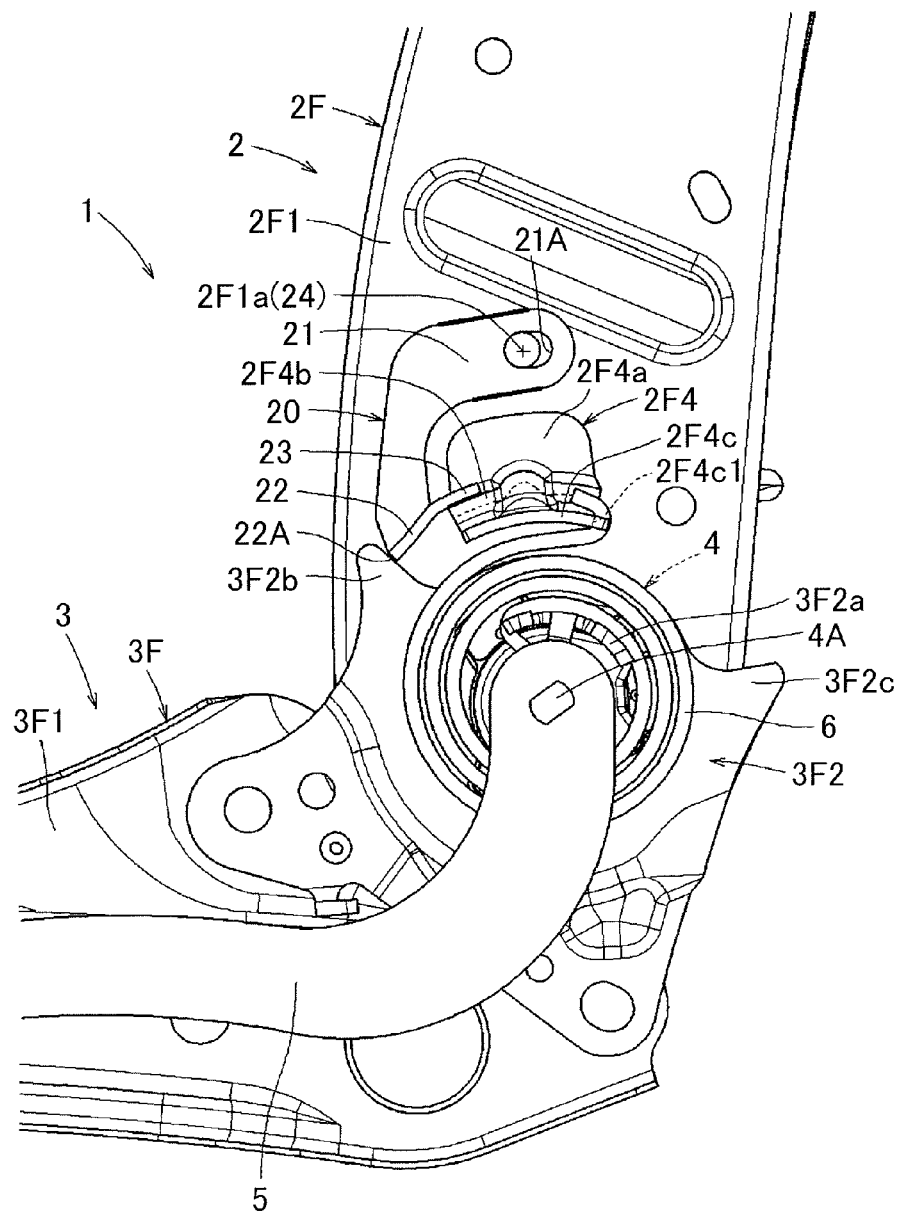
FIG. 16 is a side view of a state in which the position in which the additional stopper is set has been changed.

By setting the shape of the mounting position of the positioning hole 21A in this way, the additional stopper 20 is able to be selectively mounted in one of two positions to the side frame 2F1 of the seatback 2. As a result, as shown in FIGS. 15 and 16, the highest raised position of the backrest angle of the seatback 2 is able to be easily changed by an adjustment that involves changing the position in which the additional stopper 20 is set.

The additional stopper 20 is set in a state in which the curved piece 23 is surface abutted against the upper surface of the engaging piece 2F4b of the bracket 2F4 from above, by inserting the positioning pin 24 into the positioning hole 21A in the additional stopper 20, and placing the front surface 22A (the abutting surface) of the engaging piece 22 in surface abutment with the forward tilt stopper 3F2b of the lower arm 3F2, as shown in FIG. 18. Then, the abutting portions of the curved piece 23 and the engaging piece 2F4b of the bracket 2F4 are welded together along the peripheral edge portions thereof, such that the additional stopper 20 is integrally and strongly joined to the thick plate-shaped bracket 2F4 that has high structural strength. The additional stopper 20 is also integrally and strongly joined to the side frame 2F1 by welding the abutting portions of the fixed piece 21 and the side frame 2F1 together along the peripheral edge portions thereof.

Here, the curved piece 23 of the additional stopper 20 and the engaging piece 2F4b of the bracket 2F4 are each formed in a shape curved in an arc around the tilt center of the seatback 2 (i.e., around the center point of the recliner 4). Therefore, even if the mounting position where the additional stopper 20 is mounted to the side frame 2F1 is switched between the two mounting positions described above, as shown in FIG. 17, the curved piece 23 of the additional stopper 20 will still be kept surface abutted against the upper surface of the engaging piece 2F4b of the bracket 2F4 from above. Therefore, the additional stopper 20 is integrally and strongly joined in constant surface abutment to the bracket 2F4, even when the mounting position of the additional stopper 20 with respect to the side frame 2F1 is changed between the two mounting positions described above.

In summary, the seat 1 of the second example embodiment has the structure described below. That is, the seat 1 includes a restricting structure that restricts the allowable adjustment range of the backrest angle of the seatback 2 that is connected to the base (the lower arm 3F2) on the floor, to within a certain range. This restricting structure has an engaging portion (the additional stopper 20) provided on the seatback 2, and an engageable portion (the forward tilt stopper 3F2b) provided on the base (the lower arm 3F2). The restricting structure is configured to restrict movement of the seatback 2 in a direction in which the backrest angle changes, by the engaging portion (the additional stopper 20) abutting against the engageable portion (the forward tilt stopper 3F2b) as a result of the seatback 2 moving in that direction (i.e., the direction in which the backrest angle changes).

The engageable portion (the forward tilt stopper 3F2b) is arranged in a fixed position on lower arm 3F2 (which is a member where the engageable portion (the forward tilt stopper 3F2b) is provided), while the engaging portion (the additional stopper 20) is able to be arranged in a selected one of a plurality (two) positions with respect to the side frame 2F1 (which is a member where the engaging portion (the additional stopper 20) is provided). The engaging portion (the additional stopper 20) is joined to the side frame 2F1 in a state in which the positioning hole 21A formed in the engaging portion (the additional stopper 20) is positioned onto the positioning pin 24 that is temporarily integrated with the side frame 2F1.

The selectable structure that enables a plurality of arrangement positions of the engaging portion (the additional stopper 20) to be selected is formed by a structure that enables a plurality of arrangement positions of the engaging portion (the additional stopper 20) to be selected, by forming a plurality of the positioning holes 21A (i.e., making the positioning hole 21A long) in the engaging portion (the additional stopper 20), along a path of a specific location (the positioning pin 24) along which the engaging portion (the additional stopper 20) moves with respect to the side frame 2F1, when the backrest angle of the seatback 2 is changed while the engaging portion (the additional stopper 20) is surface abutted against, and temporarily fixed to, the engageable portion (the forward tilt stopper 3F2b).

In this way, the mounting position of the engaging portion (the additional stopper 20) on the side frame 2F1 is able to be changed by forming a plurality of positioning holes 21A in the engaging portion (the additional stopper 20) along a path of the specific location (the positioning pin 24). As a result, the position where the engaging portion (the additional stopper 20) and the engageable portion (the forward tilt stopper 3F2b) abut against each other, i.e., the allowable adjustment range of the backrest angle of the seatback 2, is able to be changed without changing the part structure of the engaging portion (the additional stopper 20).

Also, the engaging portion (the additional stopper 20) is joined to the side frame 2F1 of the seatback 2, and the positioning pin 24 is provided fit into the reference hole 2F1a when forming the side frame 2F1, that is made in the side frame 2F1. This positioning pin 24 is then removed after the engaging portion (the additional stopper 20) is welded to the side frame 2F1. With this kind of structure, the positioning pin 24 is able to be set on the side frame 2F1 using the structure of the reference hole 2F1a made in the side frame 2F1 of the seatback 2. Also, the engaging portion (the additional stopper 20) is able to be suitably joined to the side frame 2F1 of the seatback 2 without the positioning pin 24 being left in.

Also, the thick plate-shaped bracket 2F4 that has high structural strength for hooking one end of the spring (the return spring 6) that urges the seatback 2 in the forward rotating direction onto is joined to the side frame 2F1. The engaging portion (the additional stopper 20) is provided extending between the side frame 2F1 and the bracket 2F4, and welded to both of these. This kind of structure enables the engaging portion (the additional stopper 20) to be provided in a state having high structural strength by being joined to the thick plate-shaped bracket 2F4 that has high structural strength.

Also, in a structure configured to restrict forward rotational movement of the seatback 2 by the bracket 2F4 provided on the side frame 2F1 abutting against the engageable portion (the forward tilt stopper 3F2b) provided on the base (the lower arm 3F2) as a result of the seatback 2 rotating forward, when the engageable portion (the additional stopper 10) is not installed, the engaging portion (the additional stopper 20) is provided later (i.e., retrofitted) as a portion that restricts movement of the seatback 2 in the forward rotating direction by abutting against the engageable portion (the forward tilt stopper 3F2b) before the bracket 2F4 does.

In this way, in a structure configured such that the allowable adjustment range of the backrest angle of the seatback 2 is restricted to an angle (position) where the bracket 2F4 provided on the side frame 2F1 of the seatback 2 abuts against the engageable portion (the forward tilt stopper 3F2b) provided on the base (the lower arm 3F2) as the standard specification, the allowable adjustment range of the backrest angle of the seatback 2 is able to be adjusted (i.e., reduced) to an appropriate range using the structure of the standard specifications, by adding the engaging portion (the additional stopper 20) later.

Heretofore, modes for carrying out the invention have been described using two example embodiments, but the invention may also be carried out in a variety of other modes aside from the example embodiments described above. For example, the "vehicle seat" of the invention is a seat that may be broadly applied to a seat used in another type of vehicle other than an automobile, such as a railway (e.g., a train), a truck, a bus, an aircraft, and a marine vessel and the like. Also, the "base" on the floor to which the seatback is connected is a constituent member of the seat cushion when the seatback has a structure in which the seat cushion is attached as illustrated in the example embodiments above. In a case in which the seatback is connected to the floor not via the seat cushion, a member on the floor to which the seatback is connected becomes the base.

Also, with the structure of the invention, a structure in which the positioning hole is a long hole and the positioning pin is provided in only one location in a fixed position illustrated by the second example embodiment, may also be applied to the structure illustrated by the first example embodiment. Also, with the structure of the invention, a structure in which the positioning pin is able to be mounted in a plurality of locations and the positioning hole has a shape that is able to receive the positioning pin at only one location illustrated by the first example embodiment, may be applied to the structure illustrated by the second example embodiment. Also, in the second example embodiment, the shape of the positioning hole is described as being a long hole shape that is able to receive the positioning pin at any position, but the shape of the positioning hole may also be formed by a plurality of intermittent hole shapes that are able to receive the positioning pin only at two locations where the additional stopper (the engaging portion (the engageable portion in the first example embodiment)) is mounted.

What is claimed is:

1. A vehicle seat comprising:
a restricting structure that restricts an allowable adjustment range of a backrest angle of a seatback connected to a base on a floor, to within a certain range, wherein
the restricting structure has an engaging portion provided on the seatback, and an engageable portion provided on the base, and is configured to restrict movement of the seatback in a direction in which the backrest angle changes, by the engaging portion and the engageable portion abutting against one another as a result of the seatback moving in the direction in which the backrest angle changes,
the engaging portion is arranged in a fixed position on the seatback, and the engageable portion is configured to be arranged in a selected one of a plurality of arrangement positions with respect to the base where the engageable portion is provided,
the engageable portion is provided in a selected arrangement position within a region where a given portion of the engageable portion moves with respect to the base, when the backrest angle of the seatback is changed while the engageable portion is temporarily fixed to the engaging portion while being abutted against the engaging portion,
the engageable portion is joined to the base, in a state in which a positioning hole formed in the engageable portion is positioned by being fit onto a positioning pin supported at the base,
a selectable structure that enables the plurality of arrangement positions of the engageable portion to be selected is formed by providing the positioning pin in a plurality of locations with respect to the base, along a path of the positioning hole along which the engageable portion moves with respect to the base, when the backrest angle of the seatback is changed while the engageable portion is temporarily fixed to the engaging portion while being kept surface abutted against the engaging portion,
the base is formed as a thick plate member that is directly joined to a recliner configured to adjust the backrest angle of the seatback, and
the engageable portion is provided in a position that restricts movement of the seatback by abutting against a forward tilt stopper or a backward tilt stopper formed on the thick plate member to prevent the engaging portion from abutting against the forward tilt stopper or the backward tilt stopper.

2. The vehicle seat according to claim 1, wherein the positioning pin is provided in a state integrated with the thick plate member by a jig that supports the thick plate member, and is removed after the engageable portion is welded to the thick plate member.

3. The vehicle seat according to claim 1, wherein the other is the engaging portion, and is joined to a side frame of the seatback that will be the second member, and the positioning pin is provided fit into a reference hole when forming the side frame, that is made in the side frame, and is removed after the engaging portion is welded to the side frame.

4. The vehicle seat according to claim 3, wherein a thick plate-shaped bracket onto which one end of a spring for urging the seatback in the forward rotating direction is to be hooked is joined to the side frame, and the engaging portion is provided extending between the side frame and the bracket and welded to both.

5. The vehicle seat according to claim 4, wherein in a structure configured to restrict forward rotational movement of the seatback by the bracket provided on the side frame abutting against the engageable portion provided on the base, as a result of the seatback rotating forward, when the engaging portion is not arranged on the seatback, the engaging portion is provided in a position that restricts movement of the seatback in the forward rotating direction by abutting against the engageable portion before the bracket does.

* * * * *